(12) United States Patent
Magisano et al.

(10) Patent No.: US 7,351,910 B1
(45) Date of Patent: Apr. 1, 2008

(54) ELECTRICAL BOX ASSEMBLY

(75) Inventors: Francesco Magisano, Toronto (CA); Rocco Di Serio, Toronto (CA)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 11/524,523

(22) Filed: Sep. 21, 2006

(51) Int. Cl.
*H01H 9/02* (2006.01)

(52) U.S. Cl. .............................. 174/58; 174/61; 174/63; 248/343; 220/3.92

(58) Field of Classification Search ................. 174/58, 174/63, 61; 220/3.2, 3.7, 3.8, 3.9, 3.92; 248/343, 248/906
See application file for complete search history.

(56) References Cited

U.S. PATENT DOCUMENTS

| | | | |
|---|---|---|---|
| 3,862,351 A | 1/1975 | Schindler | |
| 3,926,330 A * | 12/1975 | Deming et al. | 220/3.9 |
| 4,082,915 A | 4/1978 | Silver | |
| 4,244,483 A | 1/1981 | Bauer | |
| 4,317,954 A * | 3/1982 | Giammarra | 174/53 |
| 4,451,108 A | 5/1984 | Skidmore | |
| 4,612,412 A | 9/1986 | Johnston | |
| 4,673,097 A | 6/1987 | Schuldt | |
| 5,399,806 A * | 3/1995 | Olson | 174/53 |
| 5,596,174 A | 1/1997 | Sapienza | |
| 5,600,093 A | 2/1997 | Herth | |
| 5,744,753 A | 4/1998 | Nattel | |
| 5,934,631 A | 8/1999 | Becker | |
| 5,934,935 A | 8/1999 | Kameyama | |
| 6,057,509 A | 5/2000 | Simmons | |
| 6,147,304 A | 11/2000 | Doherty | |
| 6,198,045 B1 * | 3/2001 | Roesch | 174/58 |
| 6,239,365 B1 | 5/2001 | McEvers | |
| 6,756,541 B1 * | 6/2004 | Mollick et al. | 174/58 |
| 7,075,004 B1 * | 7/2006 | Gretz | 174/50 |
| 2003/0006353 A1 | 1/2003 | Dinh | |

\* cited by examiner

*Primary Examiner*—Dhiru R. Patel
(74) *Attorney, Agent, or Firm*—Marcus R. Mickney; Mark S. Bicks; Alfred N. Goodman

(57) ABSTRACT

An electrical box assembly adapted to receive two different types of fasteners, such as screws and nails. The electrical box assembly has a base with an outer edge. A wall extends outwardly from the outer edge of the base that forms a cavity therein. A first fastener support on the wall is adapted to receive a first fastener. A second fastener support on the wall is adapted to receive a second fastener, wherein the first and second fasteners are different types of fasteners.

36 Claims, 28 Drawing Sheets

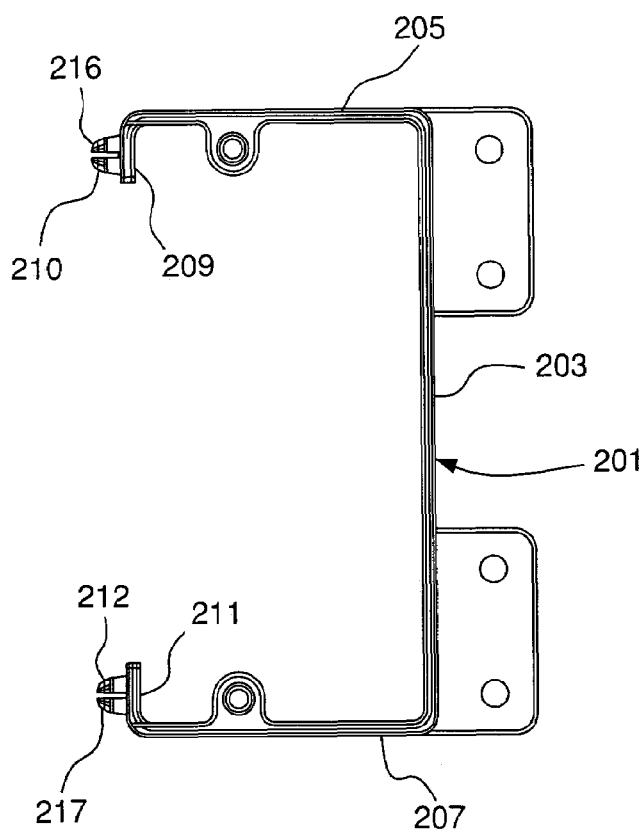
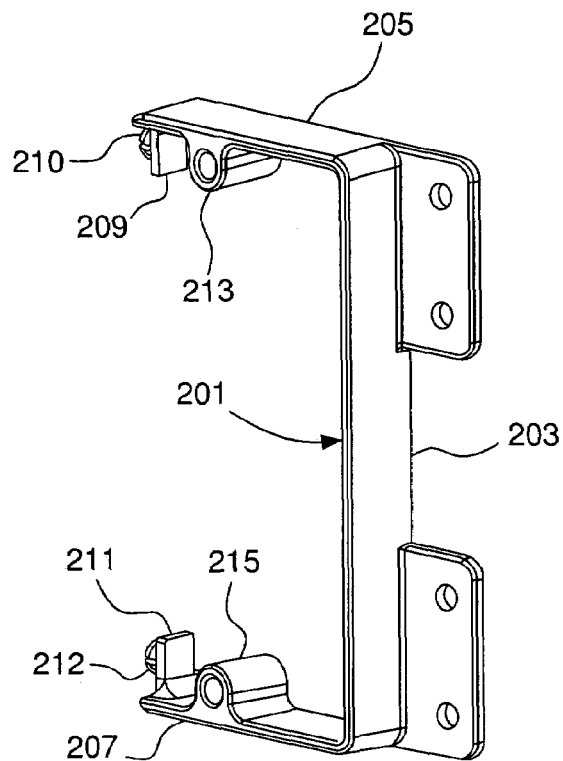
FIG. 28
FIG. 29

ELECTRICAL BOX ASSEMBLY

FIELD OF THE INVENTION

The present invention relates to an electrical box having a plurality of fastener supports to provide an installer with multiple installation options. More particularly, the present invention relates to a single gang electrical box having both nail and screw supports, and having mounting holes to mount additional low voltage frames or mounting brackets after the electrical box has been mounted to a support. Still more particularly, the present invention relates to an electrical box having a plurality of fastener supports in which the fastener supports securely receive the fasteners such that the fasteners may be shipped in position for installation with the electrical box, thereby preventing accidental removal of the fasteners from the electrical box.

BACKGROUND OF THE INVENTION

Electrical boxes are typically used in residential, commercial and industrial construction environments to provide accessibility to and control of electrical service. Electrical boxes are mounted to studs, and walls are then formed in front of the studs that are generally substantially flush with the front of the electrical box. Electrical wires are run into the interior of the electrical box from behind the wall to provide electrical service. Faceplates secured to the front of the electrical boxes provide access to the interior wires of the electrical box from in front of the formed wall.

One problem with existing electrical boxes is the inability of the installer to use either nails or screws to mount the electrical box to the stud. Existing electrical boxes can accept only screws or only nails, not both. An installer has no choice regarding how to mount the electrical box to the stud as the correct fastener for which the box was manufactured must be used. Therefore, the installer must ensure he has the proper fasteners for the electrical boxes to be installed, or the electrical boxes cannot be installed correctly. Existing electrical boxes that accept only one type of fastener increase the required inventory for installers that want to be able to mount electrical boxes with either screws or nails, as both types of electrical boxes must be available. Additionally, requiring the installer to ensure the correct fastener is available for installation of the existing electrical boxes is inefficient and increases the time required to complete the installation process. A need exists for an electrical box that is adapted to receive either screws or nails.

Another problem with existing electrical boxes is that the installer must locate the required mounting fasteners to mount the electrical boxes to the studs. The mounting fasteners are often lost or separated from the electrical boxes prior to mounting the electrical boxes, thereby increasing the installation time required to mount the electrical boxes. A need exists for an electrical box having screw and nail supports that allows screws and nails to be securely attached to the electrical box, and further preventing accidental removal of the screws and nails from the electrical box.

A need exists for an electrical box that is adapted to receive either screws or nails to mount the electrical box to a stud.

SUMMARY OF THE INVENTION

Accordingly, it is a primary objective of the present invention to provide an improved electrical box.

Accordingly, another objective of the present invention is to provide an electrical box that is adapted to receive either screw or nail fasteners to mount the electrical box to a stud.

Accordingly, another objective of the present invention is to provide an electrical box that has screw and nail supports to facilitate movement of the electrical box with screws and nails securely attached thereto and to prevent accidental removal of the screws and nails from the electrical box prior to installation.

Accordingly, another object of the present invention is to provide mounting holes in the electrical box mounted to the stud that are adapted to receive a low voltage frame or mounting bracket.

The foregoing objects are basically attained by providing an electrical box assembly that includes a base having an outer edge. A wall extends outwardly from the outer edge of the base and forms a cavity therein. A first fastener support on the wall is adapted to receive a first fastener. A second fastener support on the wall is adapted to receive a second fastener. The first and second fasteners are different types of fasteners. The first and second fastener supports allow the electrical box to be mounted to a stud with either a first or second fastener, thereby reducing the inventory by not requiring separate electrical boxes for each type fastener.

Other objects, advantages and salient features of the invention will become apparent from the following detailed description, which, taken in conjunction with the annexed drawings, discloses exemplary embodiments of the invention.

BRIEF DESCRIPTION OF THE DRAWINGS

The above aspects and features of the present invention will be more apparent by describing certain exemplary embodiments of the present invention with reference to the accompanying drawings, in which:

FIG. 28 is a front elevational view of a low voltage frame; and

FIG. 29 is a perspective view of the low voltage frame of FIG. 28.

Throughout the drawings, like reference numerals will be understood to refer to like parts, components and structures.

DETAILED DESCRIPTION OF EXEMPLARY EMBODIMENTS

Figure 1:
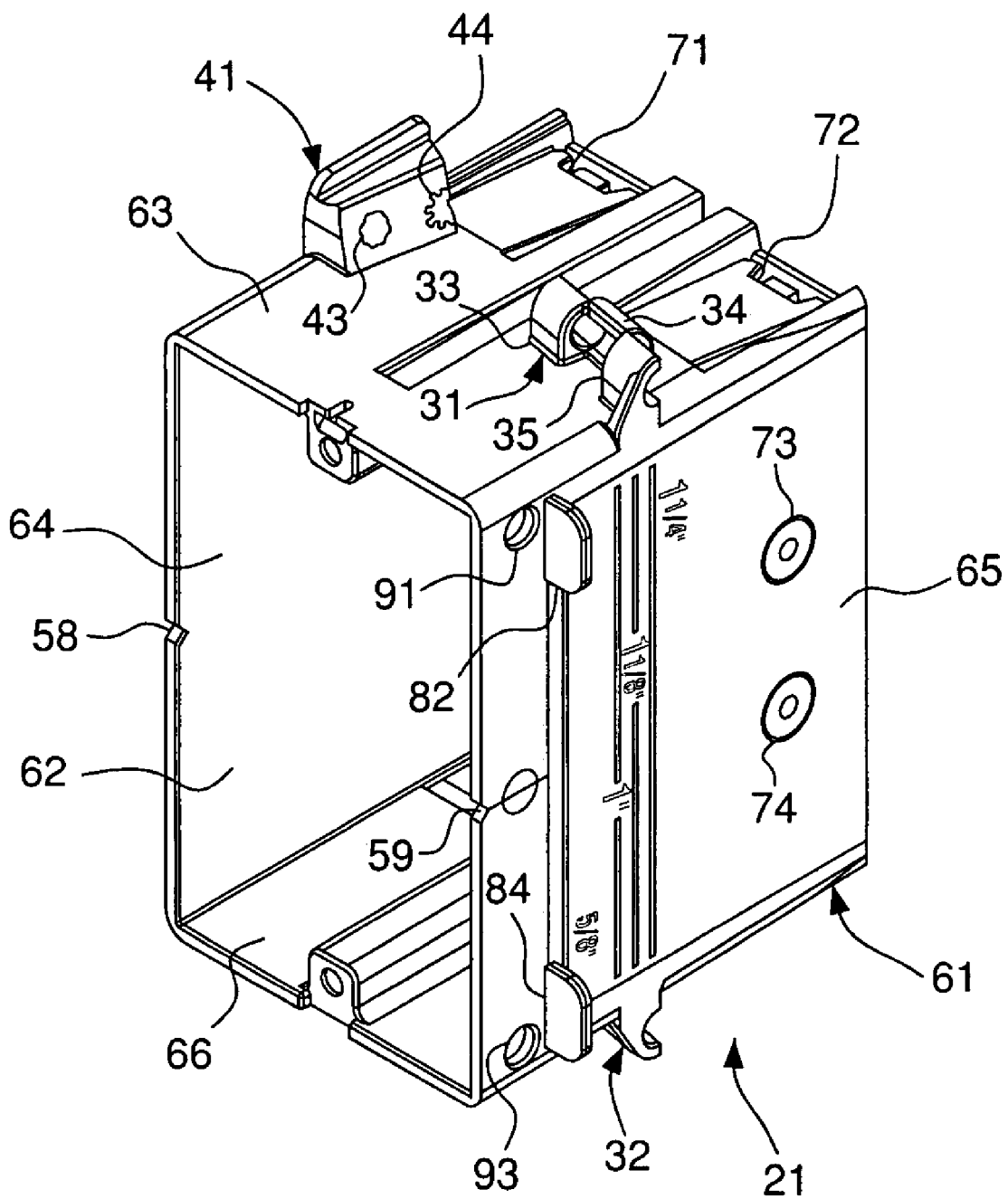
FIG. 1 is a perspective view of an electrical box according to a first exemplary embodiment of the present invention.

As shown in FIGS. 1-29, an electrical box assembly 21 according to exemplary embodiments of the present invention has first and second fastener supports 31 and 41, respectively, adapted to receive either a first or second fastener to provide an installer with multiple installation options for an electrical box. The electrical box assembly is adapted to receive two different types of fasteners, such as screws and nails. The electrical box assembly 21 has a base 51 with an outer edge. A wall 61 extends outwardly from the outer edge of the base. A cavity 62 is formed by the wall 61 and the base 51. A first fastener support 31 on the wall 61 is adapted to receive a first fastener. A second fastener support 41 on the wall 61 is adapted to receive a second fastener, wherein the first and second fasteners are different types of fasteners.

Figure 2:
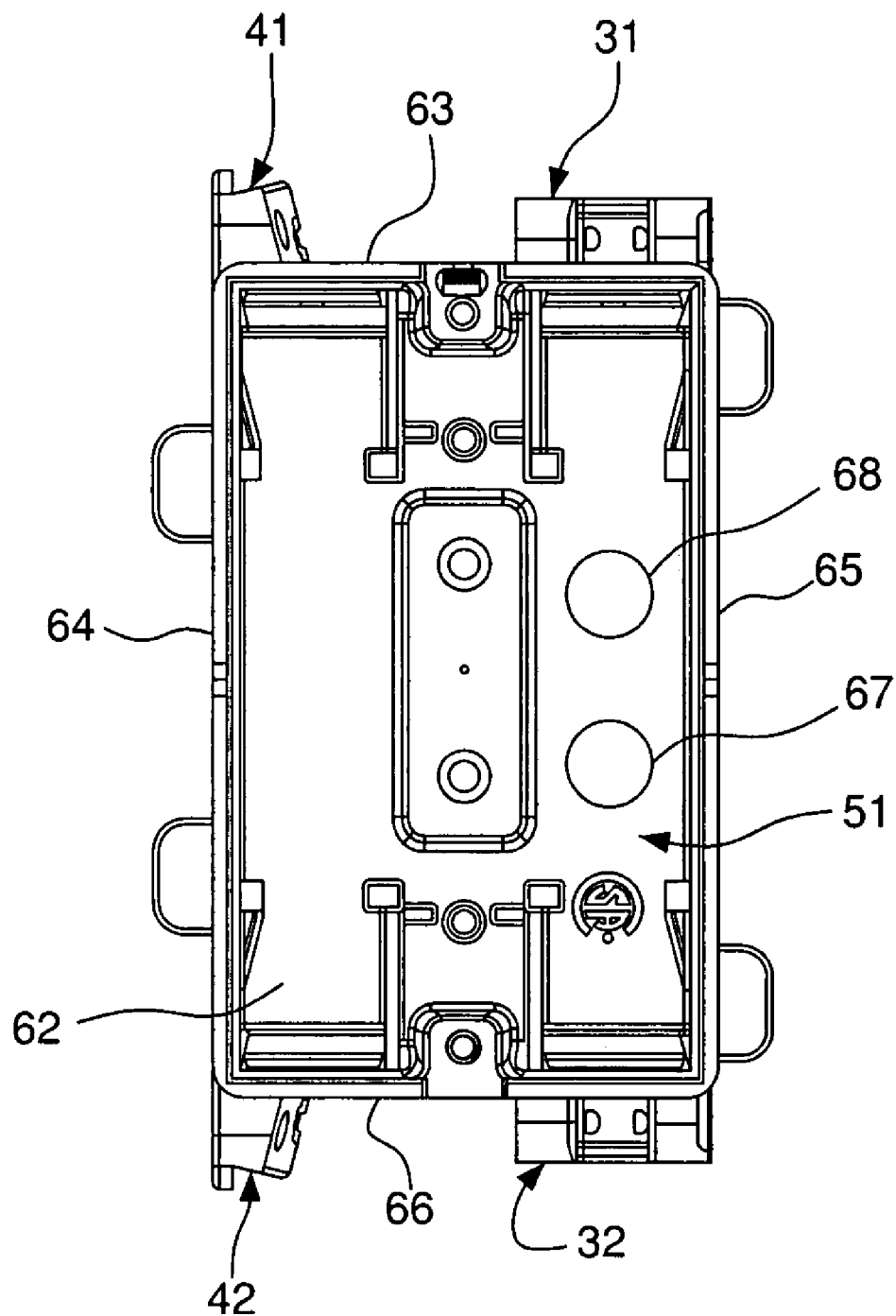
FIG. 2 is a front elevational view of the electrical box of FIG. 1.
Figure 5:
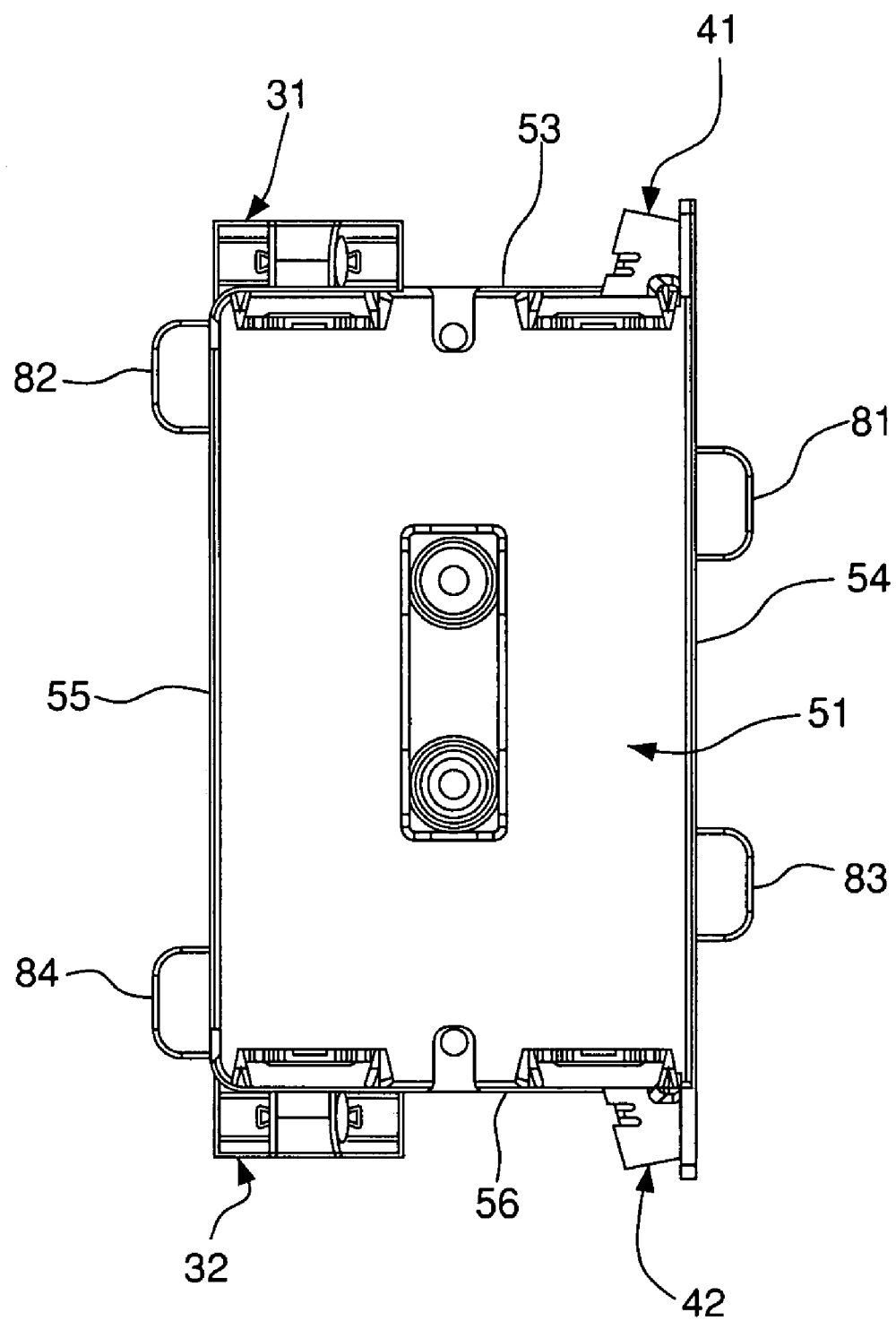
FIG. 5 is a rear elevational view of the electrical box of FIG. 1.

The electrical box assembly 21 has a base 51 with an outer edge from which a wall 61 extends outwardly, as shown in FIGS. 1 and 2. Preferably, the base 51 is substantially rectangular and has a top edge 53, first and second outer edges 54 and 55, and a bottom edge 56, as shown in FIG. 5. A top wall 63 extends outwardly from the top outer edge 53. A bottom wall 66 extends outwardly from the bottom outer edge 56. A first side wall 64 extends outwardly from the first side outer edge 54 and a second side wall 65 extends outwardly from the second outer edge 55.

A cavity 51 is formed by the top, bottom, first and second outer walls 63-66 and the base 51. Knockouts 67 and 68 in the base 51 may be removed to facilitate running wires, cables and the like into the cavity 62 of the electrical box 21. Preferably, there are a plurality of knockouts in various positions in the wall 61 to provide an installer with options regarding running low voltage wires into and out of the cavity of the electrical box.

A center mark 58 may be formed in one of the walls to facilitate the alignment of a plurality of electrical boxes installed in a wall or in a room. As shown in FIG. 1, a first center mark 58 is disposed in the first outer wall 64 and a second center mark 59 is formed in the second outer wall 65 and is vertically aligned with the first center mark. Preferably, the center marks are V-shaped notches. Traditionally, an installer would align a plurality of boxes by their bottom walls 66. However, this does not result in the installed boxes being aligned because the distance between the top and bottom walls is not always consistent. Thus, using a center mark 58 to align a plurality of installed electrical boxes results in a more accurate alignment of the installed electrical boxes on a wall or in a room.

Figure 6:
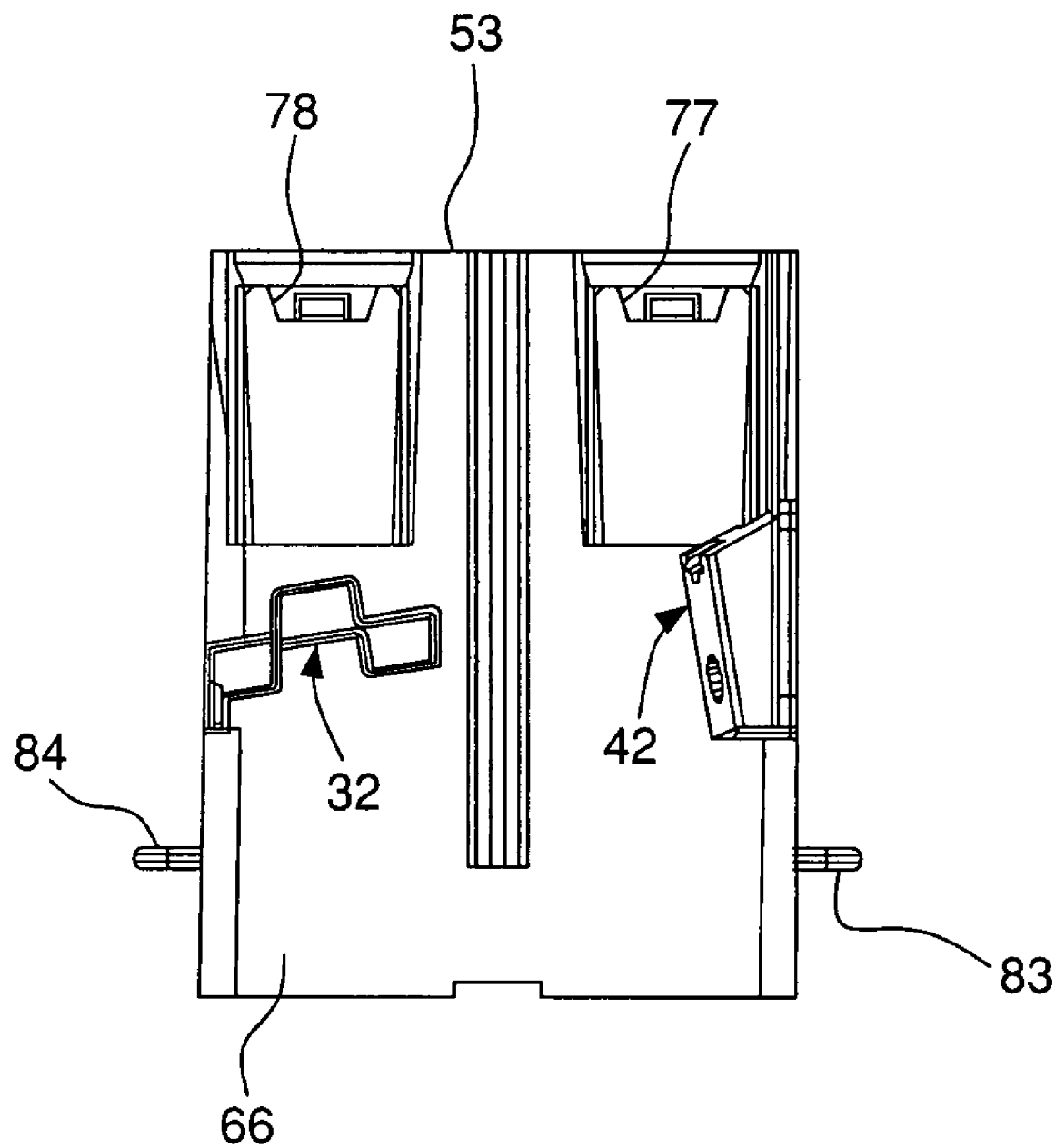
FIG. 6 is a bottom plan view of the electrical box of FIG. 1.

Wire entry tabs 71 and 72 are disposed in the top wall 63 to facilitate running wires into the cavity 62 of the electrical box 21, as shown in FIGS. 1 and 6. Preferably, the wire entry tabs 71 and 72 are self-clamping, thereby eliminating the need for additional cable connectors, fasteners or fittings and reducing installation time. Additional wire entry tabs 77 and 78 may be disposed in the bottom wall 66, as shown in FIG. 6.

Figure 4:
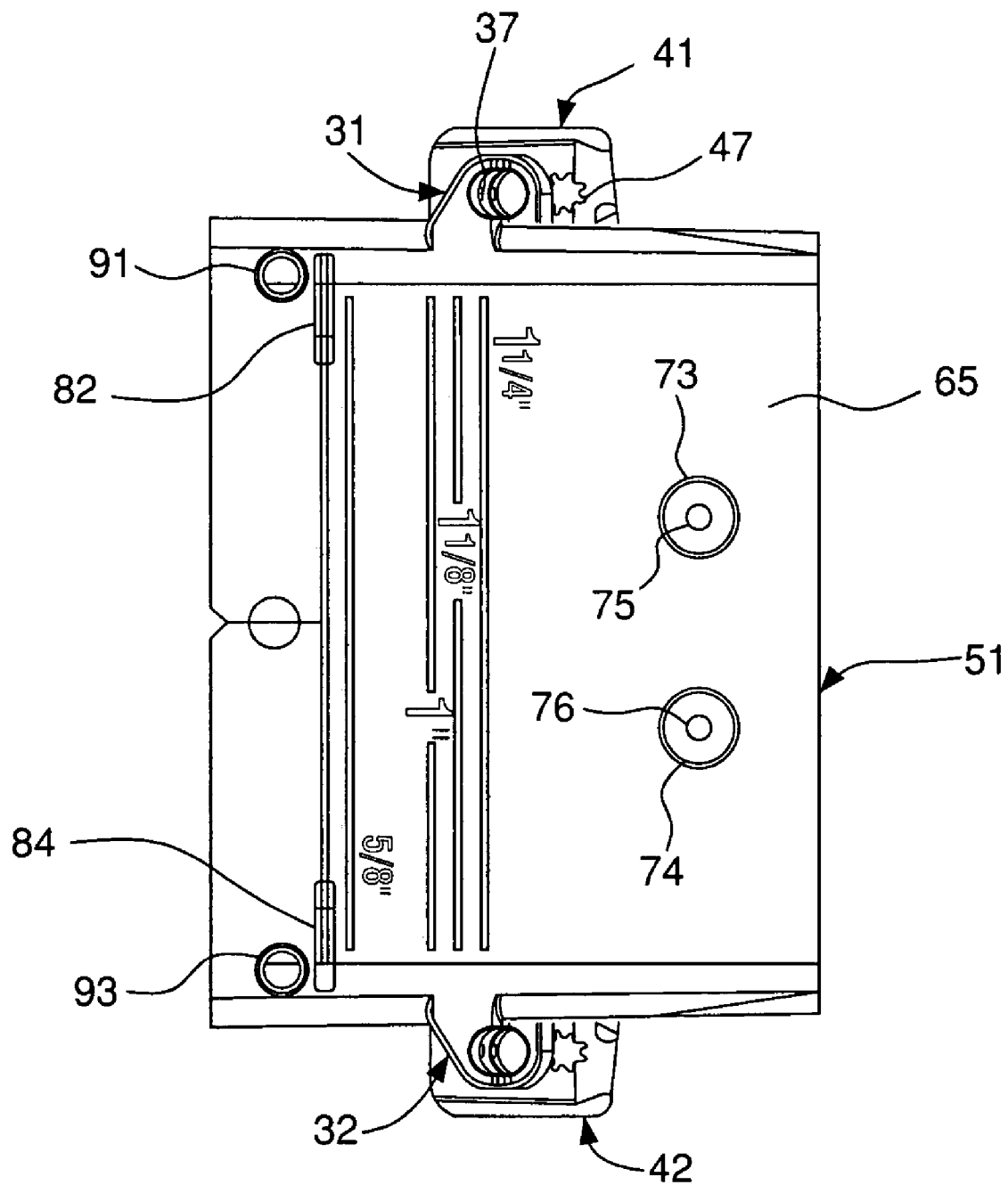
FIG. 4 is a right side elevational view of the electrical box of FIG. 1.

Drill entry points 73 and 74 are disposed in the second side wall 65, as shown in FIGS. 1 and 4. Holes 75 and 76 in the drill entry points allow an installer to insert a drill bit therein to enlarge the hole for passage of low voltage cables therethrough. The holes 75 and 76 in the drill entry points substantially prevent the drill bit from skating or sliding across the surface of the electrical box in the absence of the holes when providing an opening in the wall for passage or wires and cables therethrough. The drill entry points 73 and 74 provide an alternative passage to the wire entry tabs 71 and 72 for wires and cables that could be damaged by being clamped, such as low voltage cables, including data and telephone cables.

A first fastener support 31 is adapted to receive a first fastener 131, as shown in FIGS. 19-22 and 26. Preferably, the first fastener support 31 is disposed on the top wall 63, as shown in FIG. 6. A third fastener support 32, as shown in FIGS. 4 and 5, may also be used to receive another first fastener 132. Preferably, the third fastener support 32 is on the bottom wall 66. Preferably, the first fastener 131 is a nail. The first and third fastener supports 31 and 32 are substantially similar and on opposing walls of the electrical box assembly 21, as shown in FIGS. 4 and 5. The first fastener support 31 includes a plurality of substantially C-shaped arms 33, 34 and 35. As shown in FIG. 1, there are three arms 33, 34 and 35 to receive the first fastener. The first and third arms 33 and 35 are open facing the base 51 of the electrical box assembly 21. The second arm 34 is open facing away from the base 51, that is, the second arm is open in a direction substantially opposite to the first and third arms 33 and 35. The arms provide a frictional fit and ribs 37 for the first fastener to prevent accidental removal of the first fasteners from the first and third supports, thereby allowing the electrical box assembly 21 to be shipped with first fasteners received by the first and third fastener supports 31 and 32. Ribs 37 may extend outwardly from the arms 33, 34 and 35, as shown in FIG. 4, to facilitate retention of the first fastener by the arms. The arms are positioned adjacent the side wall that is opposite a support, such as a stud, to which the electrical box assembly 21 is mounted. As shown in FIGS. 19-27, first side wall 64 is mounted adjacent a support 11, such that the second side wall 65 is opposite the support.

Thus, the arms of the first and third fastener supports 31 and 32 are spaced from the support 11. The arms guide the first fastener 131 as the first fastener is driven into the support 11 to mount the electrical box assembly 21.

Figure 3:
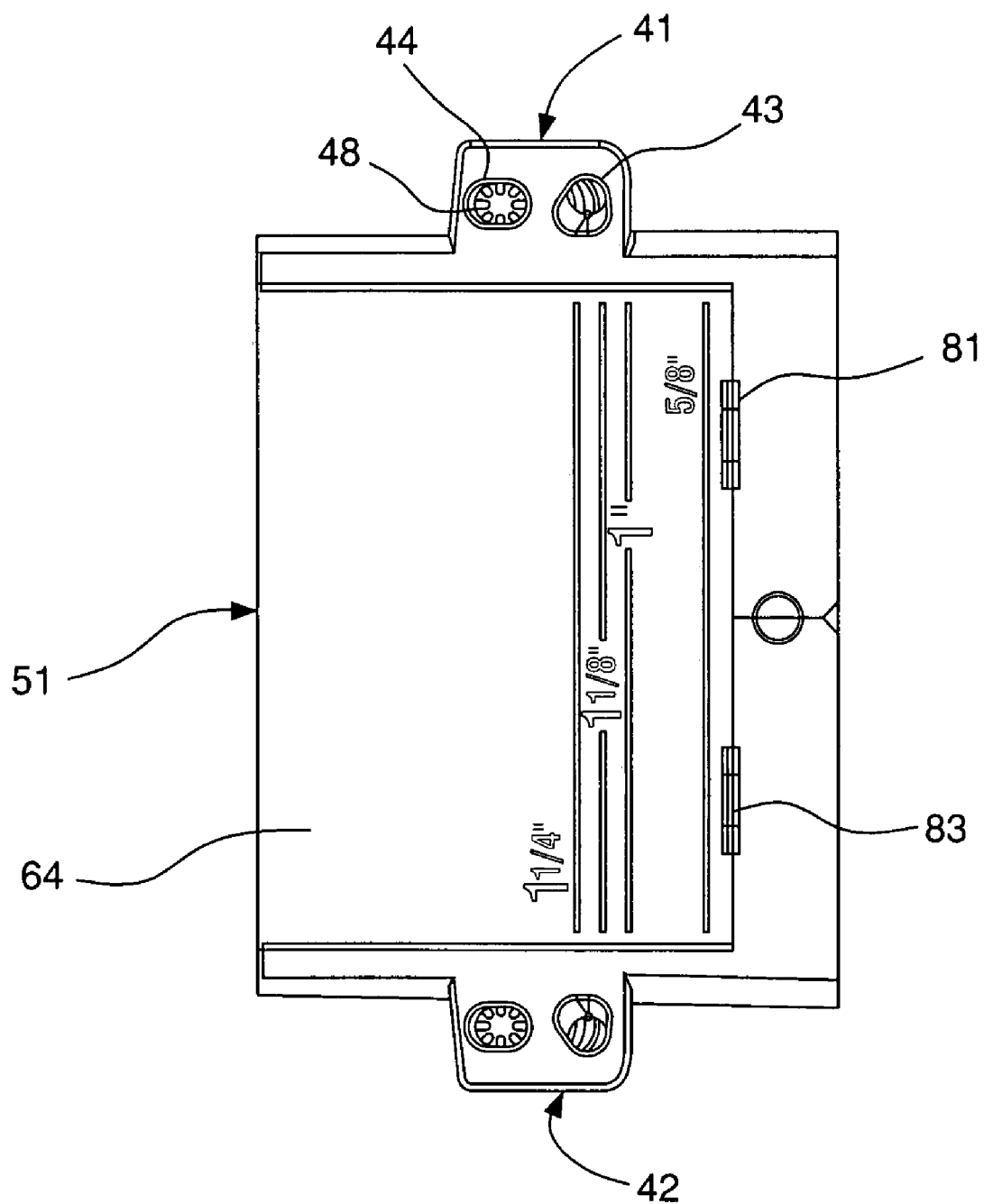
FIG. 3 is a left side elevational view of the electrical box of FIG. 1.
Figure 23:
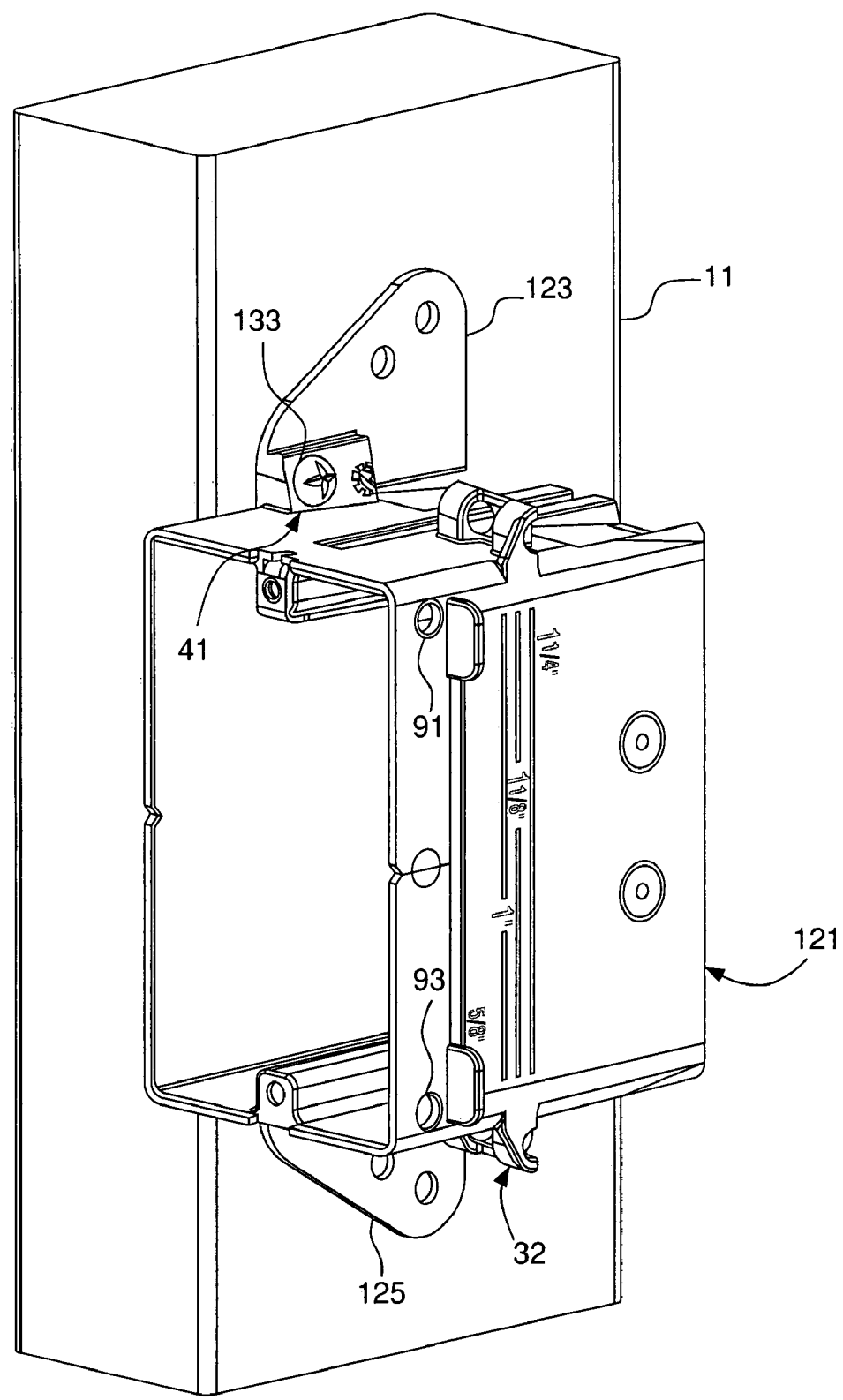
FIG. 23 is a perspective view of the electrical box of FIG. 7 secured to a support by a first fastener.
Figure 24:
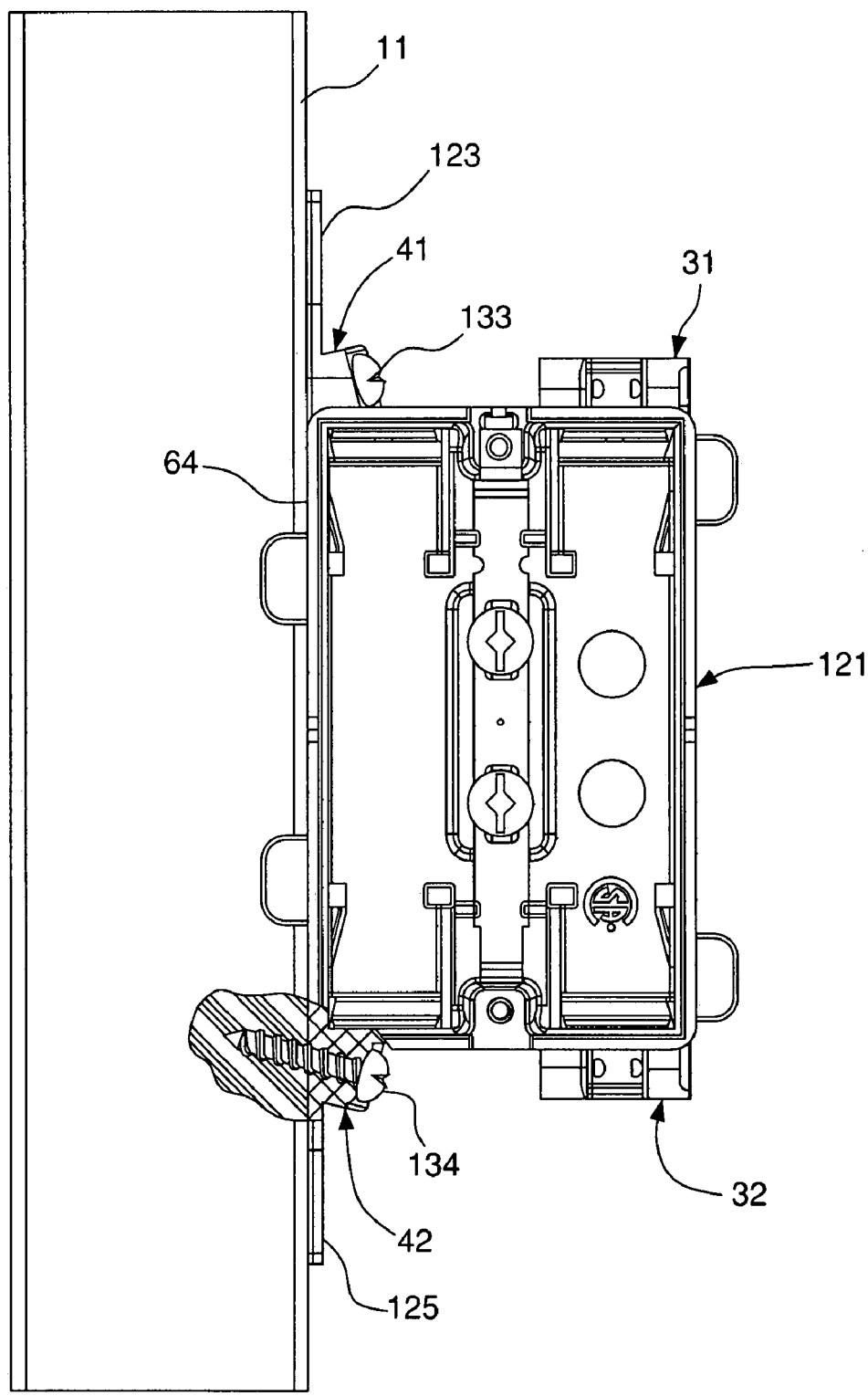
FIG. 24 is front elevational view in partial cross section of the electrical box of FIG. 23.
Figure 25:
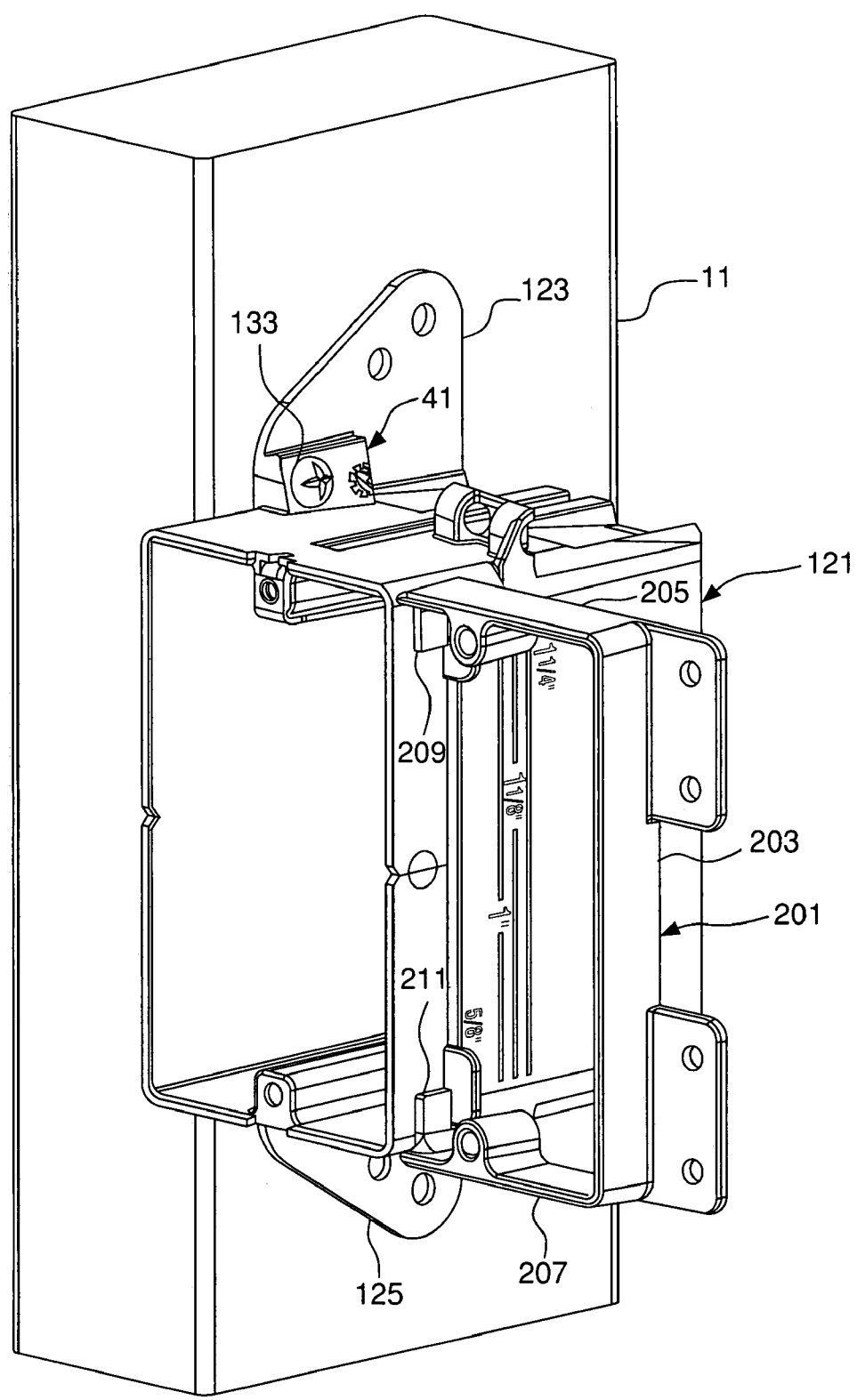
FIG. 25 is a perspective view of the electrical box of FIG. 23 to which a low voltage frame is attached.
Figure 26:
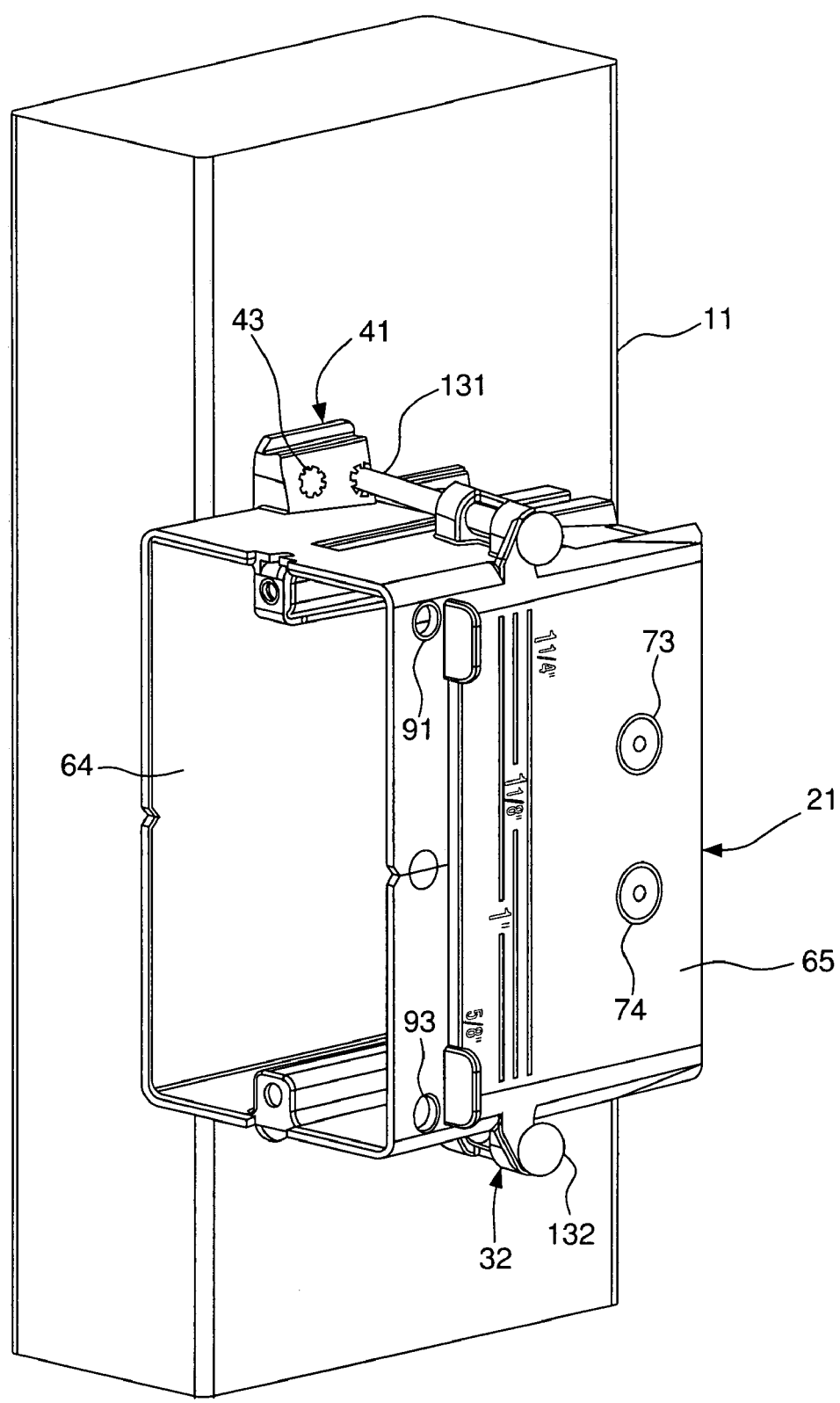
FIG. 26 is a perspective view of the electrical box of FIG. 1 secured to a support by a second fastener.
Figure 27:
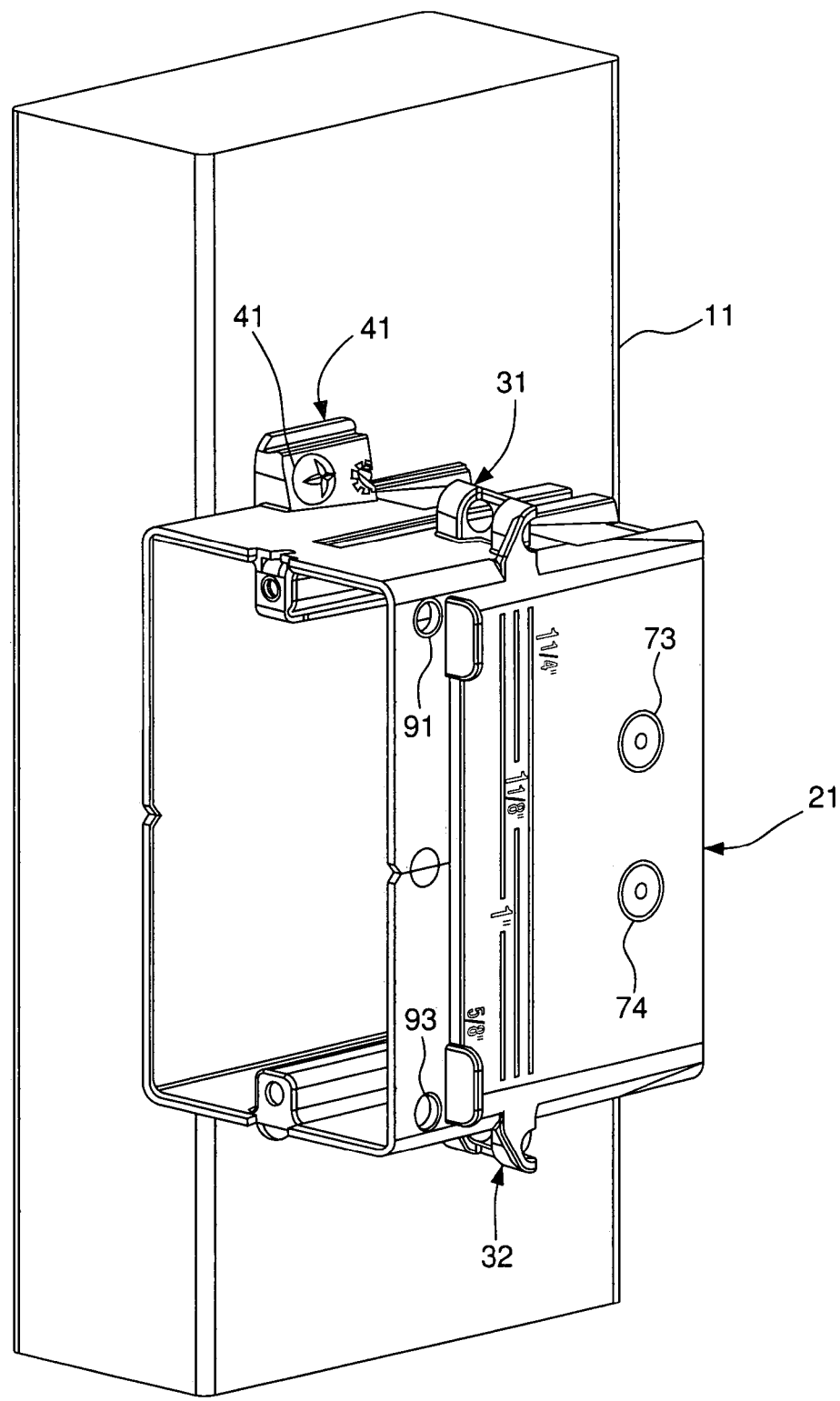
FIG. 27 is a perspective view of the electrical box of FIG. 1 secured to a support by a first fastener.

A second fastener support 41 is adapted to receive a second fastener 133, as shown in FIG. 23. Preferably, the second fastener support 41 is disposed on the top wall 63, as shown in FIGS. 1 and 6. A fourth fastener support 42 may also be used to receive another second fastener 134, as shown in FIG. 24, and is substantially similar to the second fastener support 41. Preferably, the fourth fastener support 42 is on the bottom wall 66, as shown in FIGS. 2 and 3. Preferably, the second fastener 133 is a screw, as shown in FIGS. 23-25 and 27. The second and fourth fastener supports 41 and 42 are substantially identical and are disposed on opposing walls of the electrical box assembly 21. The second fastener support 41 has a first fastener opening 43 adapted to create a friction fit with the second fastener 133 to prevent accidental removal of the second fastener from the second and fourth fastener supports, thereby allowing the electrical box to be shipped with second fasteners received by the second and fourth fastener supports. Ribs 47 may extend outwardly from the first fastener opening 43 in the second fastener support 41 to facilitate retention of the second fastener. The first fastener opening 43 is disposed adjacent the side wall 64 adjacent the support 11 to which the electrical box assembly 121 is mounted, as shown in FIG. 24. As shown in FIG. 1, the second fastener support 41 is disposed on the top wall 63 adjacent the first side wall 64 of the electrical box assembly 21. Preferably, the first fastener opening 43 is angled such that the fastener is not perpendicular to the support 11 when received therein, as shown in FIG. 24.

Figure 19:
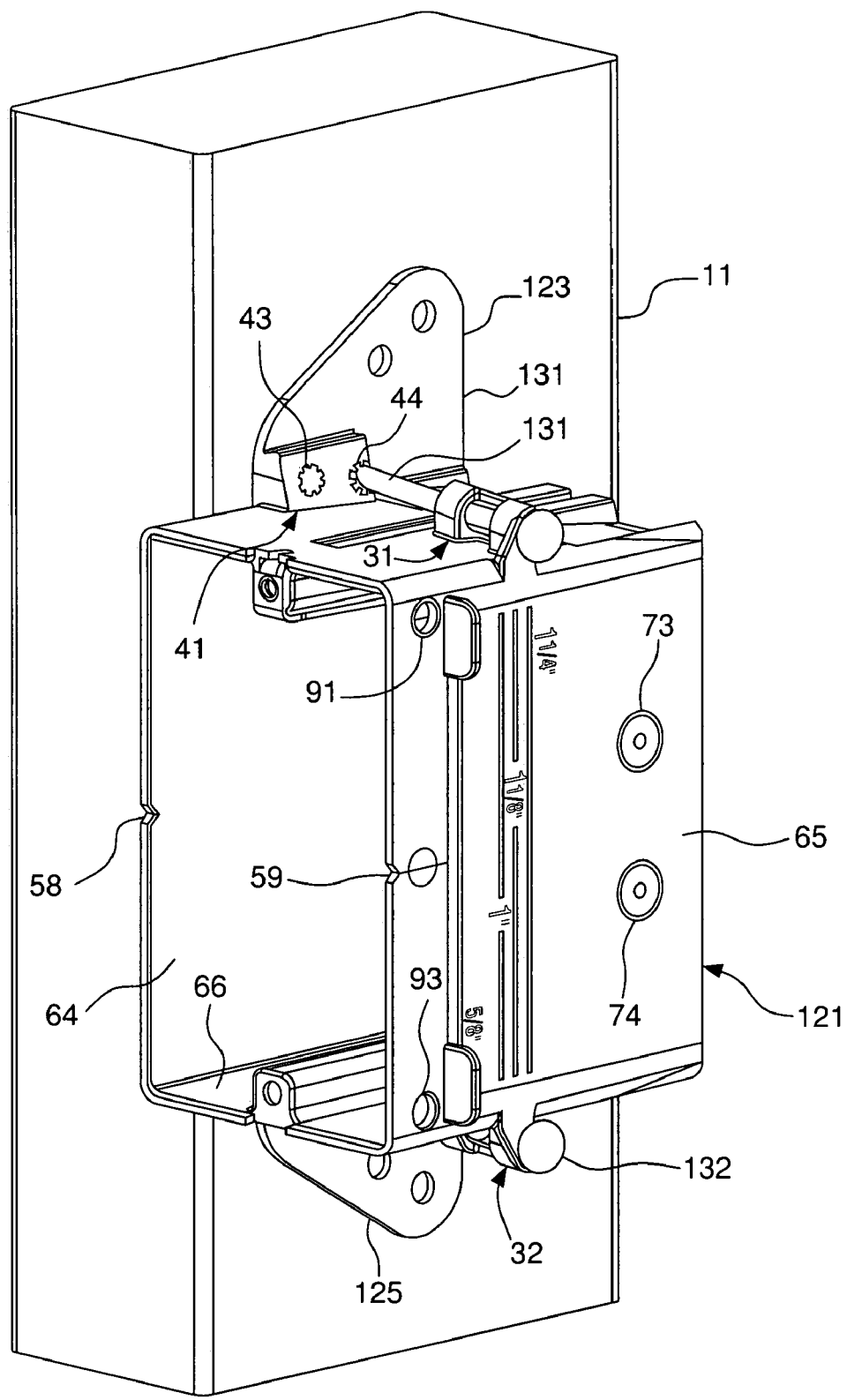
FIG. 19 is a perspective view of the electrical box of FIG. 7 secured to a support by a second fastener.
Figure 22:
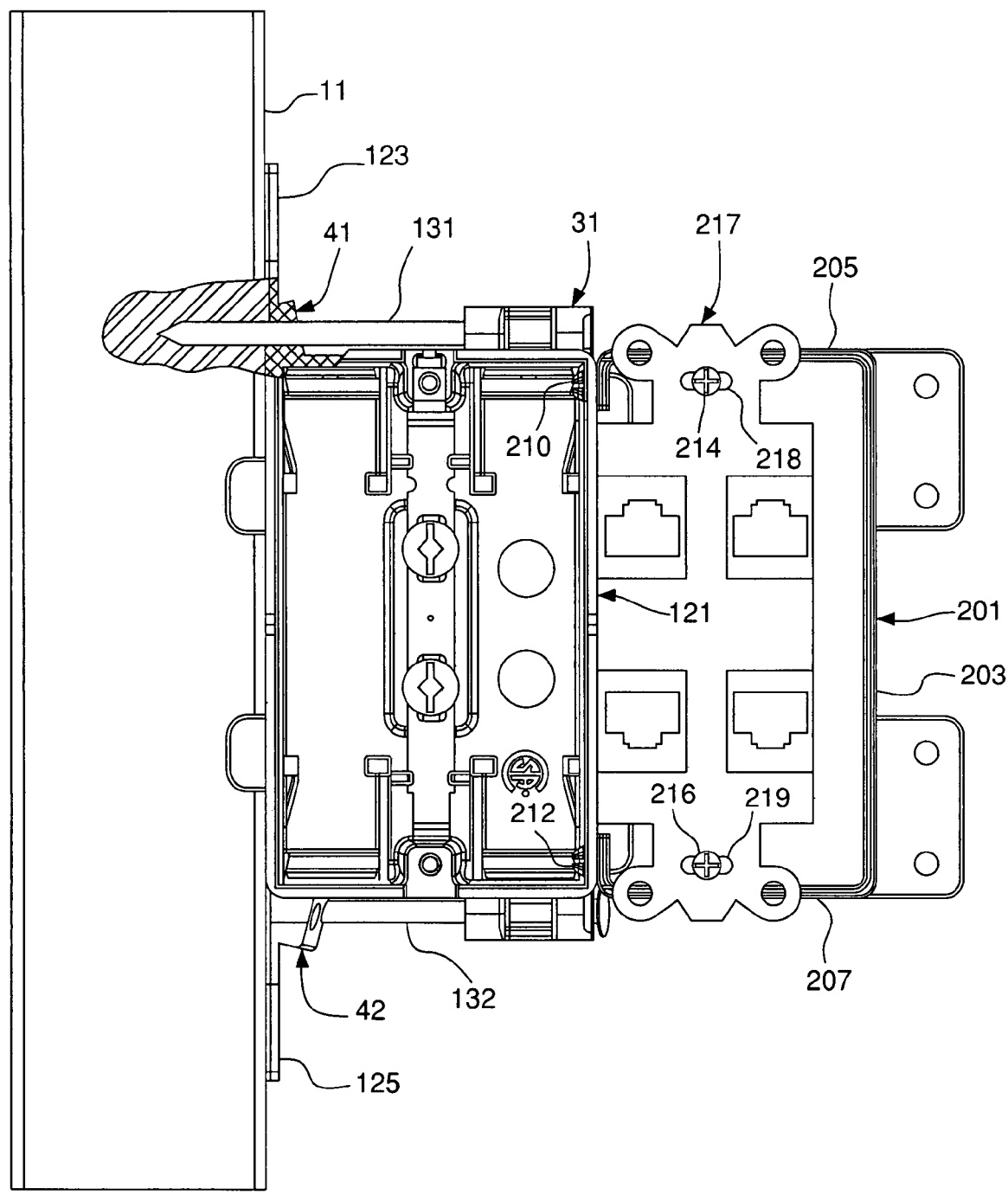
FIG. 22 is a front elevational view in partial cross section of the electrical box of FIG. 21 in which an electrical connector is connected to the low voltage frame.

A second fastener opening 44 may be disposed in the second fastener support 41, as shown in FIGS. 1 and 3. The second fastener opening 44 further facilitates guiding insertion of the first fastener 131 into the support, as shown in FIG. 19. Thus, the second fastener opening is aligned with arms 33, 34 and 35 of the first fastener support 31 to receive the first fastener. Ribs 48 extend outwardly from the second fastener opening 44, as shown in FIG. 3, to facilitate retention of the first fastener by the second fastener opening 44 of the second fastener support 41. Preferably, the first fastener support 31 and the second fastener opening 44 are aligned such that the first fastener 131 is substantially perpendicular to the support 11 when received therein, as shown in FIG. 22.

A tab 81 is disposed on a side wall of the electrical box assembly at a predetermined depth to facilitate accurate and consistent placement of the electrical box assembly on the support. Preferably, two tabs 81 and 83 are disposed on a first side wall 64 and two tabs 82 and 84 are disposed on a second side wall 65 such that the electrical box may be disposed on either side of a support.

A mounting hole 91 may be disposed in one or both of the first and second side walls 64 and 65 to facilitate receiving an additional low voltage frame 201, as shown in FIGS. 28 and 29. As shown in FIG. 1, mounting holes 91 and 93 are disposed in the second side wall 65. The first side wall 64 is adjacent the support, such that the mounting holes 91 and 93 in the second side wall may receive a corresponding member of a low voltage frame 201, as shown in FIGS. 20-22 and 25. Furthermore, the mounting holes 91 and 93 allow the low voltage frame 201 to be connected to the electrical box assembly 21 after the electrical box assembly 21 has been secured to a support 11.

The low voltage frame 201, as shown in FIGS. 28 and 29, has a first leg 203. Second and third legs 205 and 207 extend substantially perpendicularly from the first leg 203. Preferably, the second leg 205 extends from one end of the first leg and the third leg extends from opposite end. Preferably, the second and third legs 205 and 207 are substantially parallel. A first tab 209 extends from the second leg 205 and a second tab 211 extends from the third leg 207. A first protrusion 210 extends outwardly from the first tab 209 and a second protrusion 212 extends outwardly from the second tab 211. The first and second protrusions 210 and 212 are adapted to be received by the mounting holes 91 and 93 in the second side wall 65 of the electrical box assembly, as shown in FIGS. 20-22 and 25. Preferably, a portion 216 and 217 of the first and second protrusions is larger than the diameter of the mounting holes 91 and 93 to securely retain the low voltage frame 201 to the electrical box assembly 121 and to prevent accidental removal of the low voltage frame. Mounting holes 213 and 215 extend inwardly from the second and third legs 205 and 207, respectively. The mounting holes 213 and 215 are adapted to receive fasteners 214 and 216 such that an electrical connector 217 may be secured to the low voltage frame 201, as shown in FIG. 22.

A second exemplary embodiment of the electrical box assembly 121 is shown in FIGS. 7-12. The electrical box assembly 121 of the second exemplary embodiment is substantially similar to the electrical box assembly 21 of the first exemplary embodiment and the same reference numerals are used to denote corresponding features.

Figure 7:
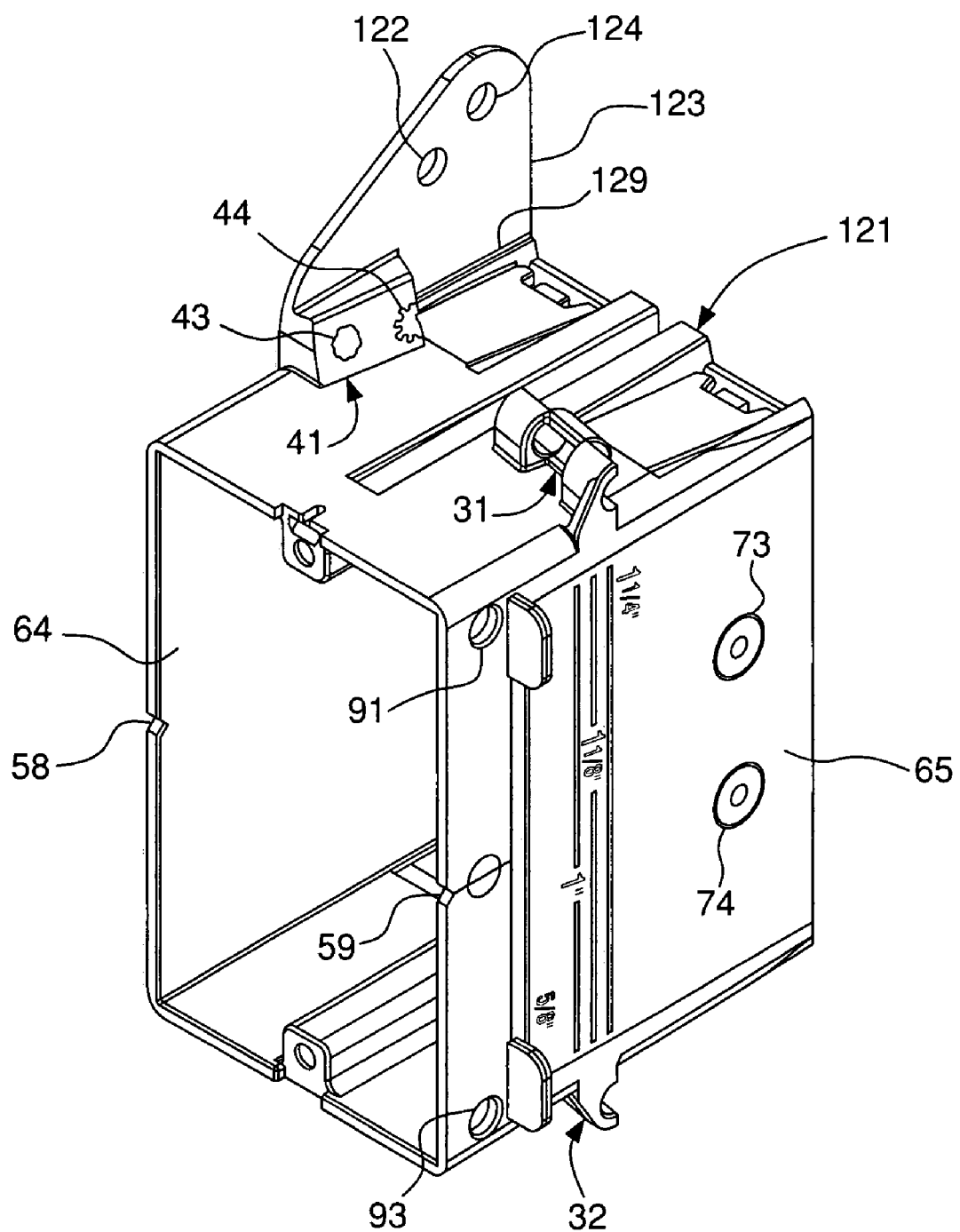
FIG. 7 is a perspective view of an electrical box having wings according to a second exemplary embodiment of the present invention.
Figure 8:
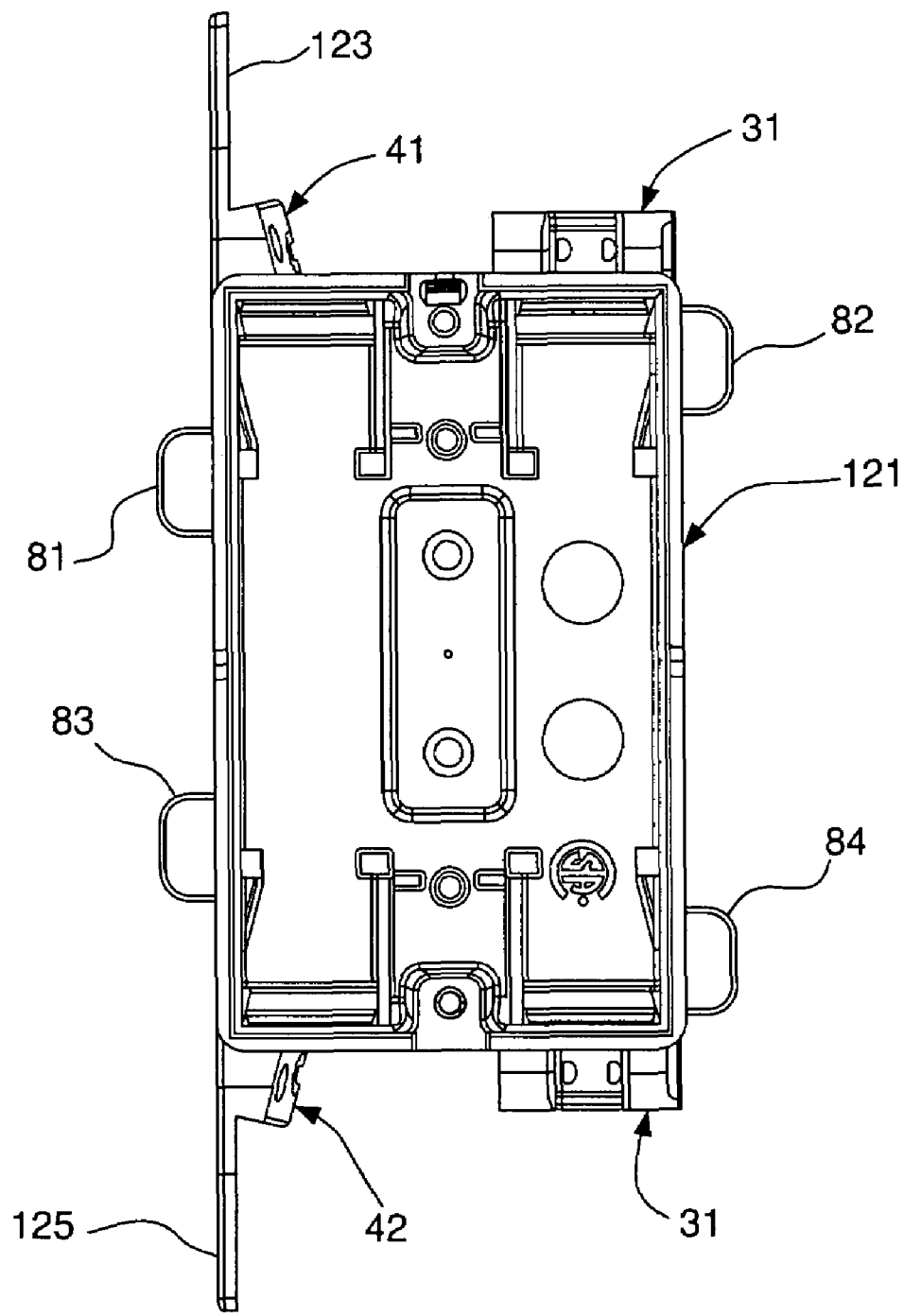
FIG. 8 is a front elevational view of the electrical box of FIG. 7.
Figure 9:
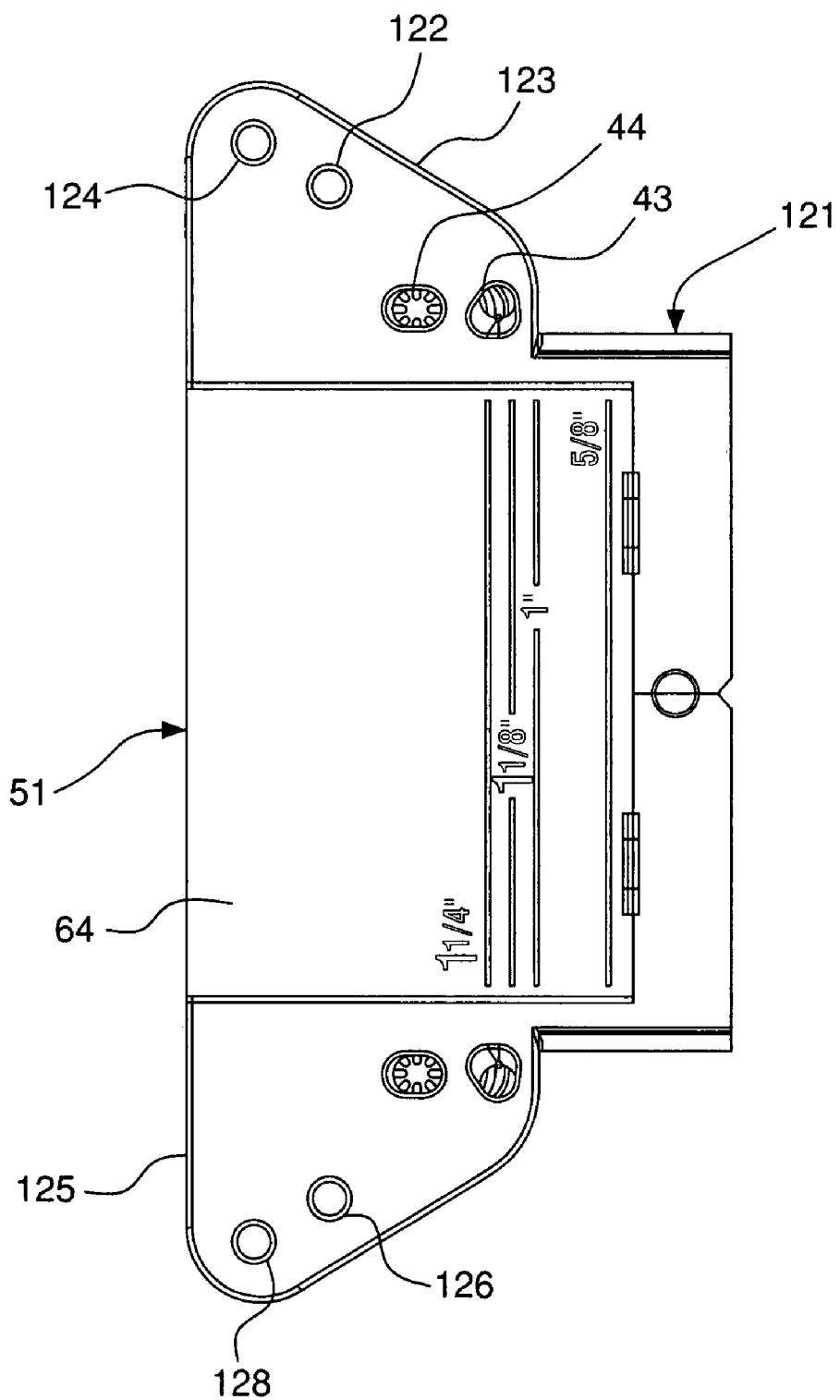
FIG. 9 is a left side elevational view of the electrical box of FIG. 7.
Figure 10:
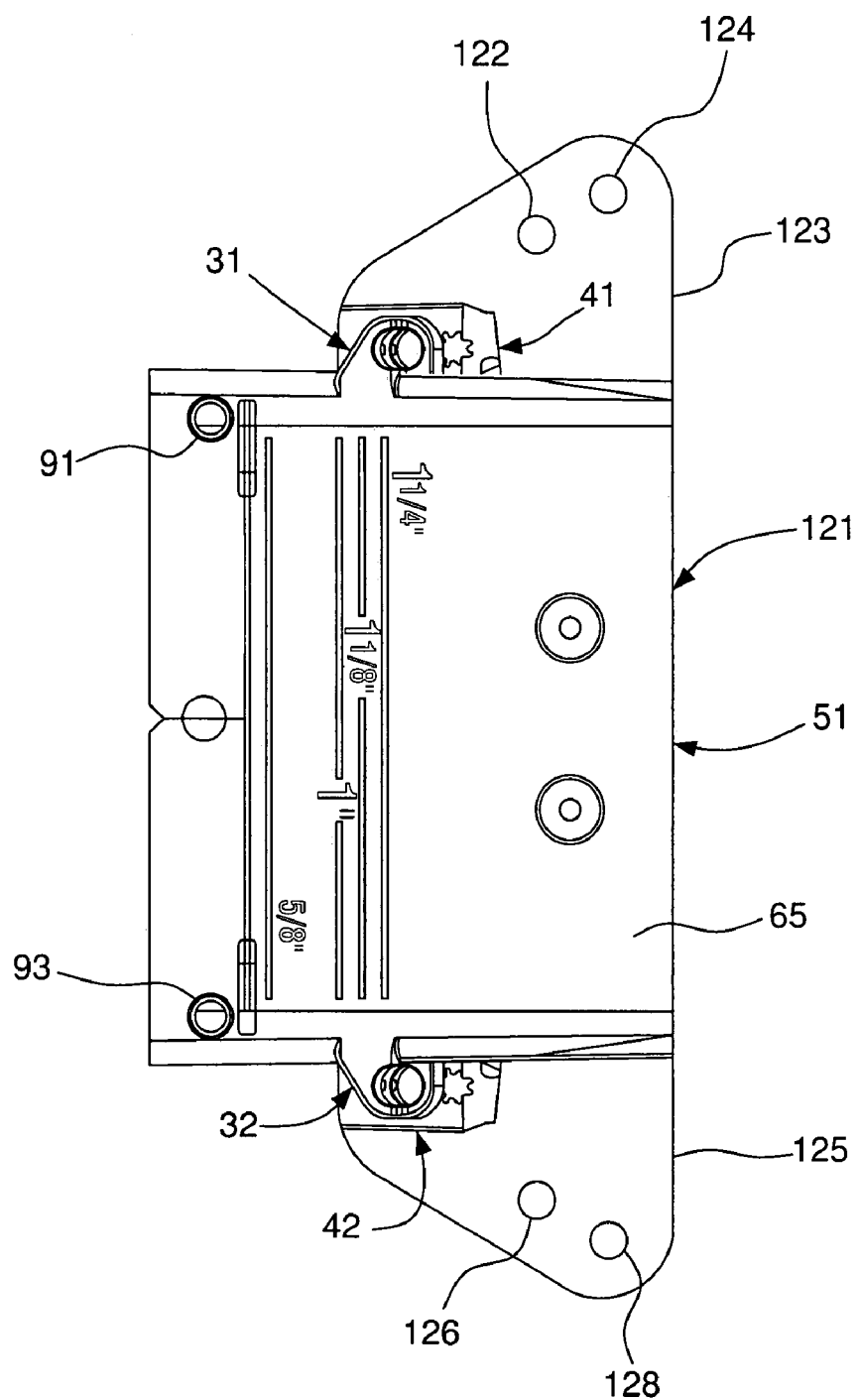
FIG. 10 is a right side elevational view of the electrical box of FIG. 7.
Figure 11:
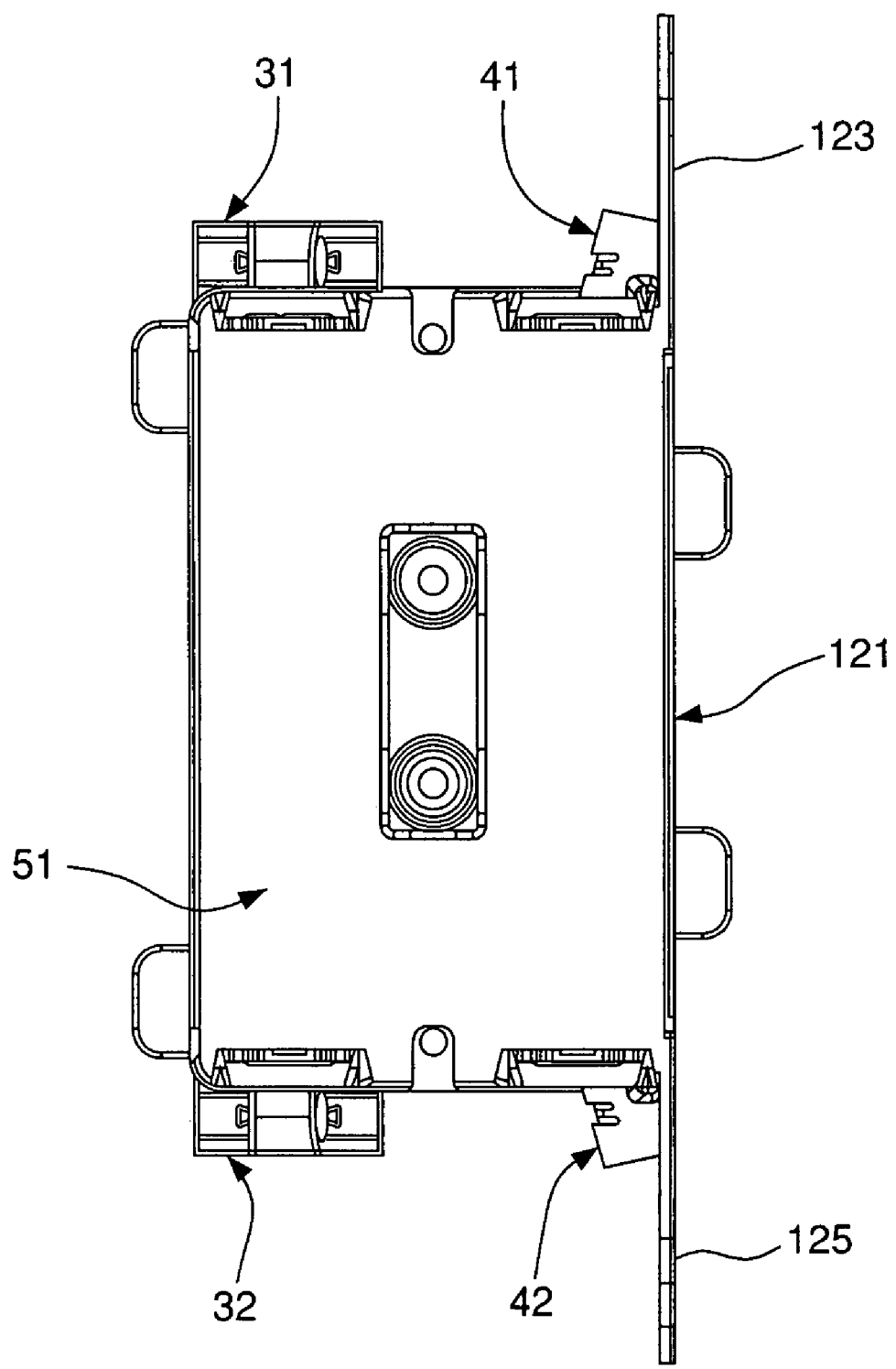
FIG. 11 is a rear elevational view of the electrical box of FIG. 7.
Figure 12:
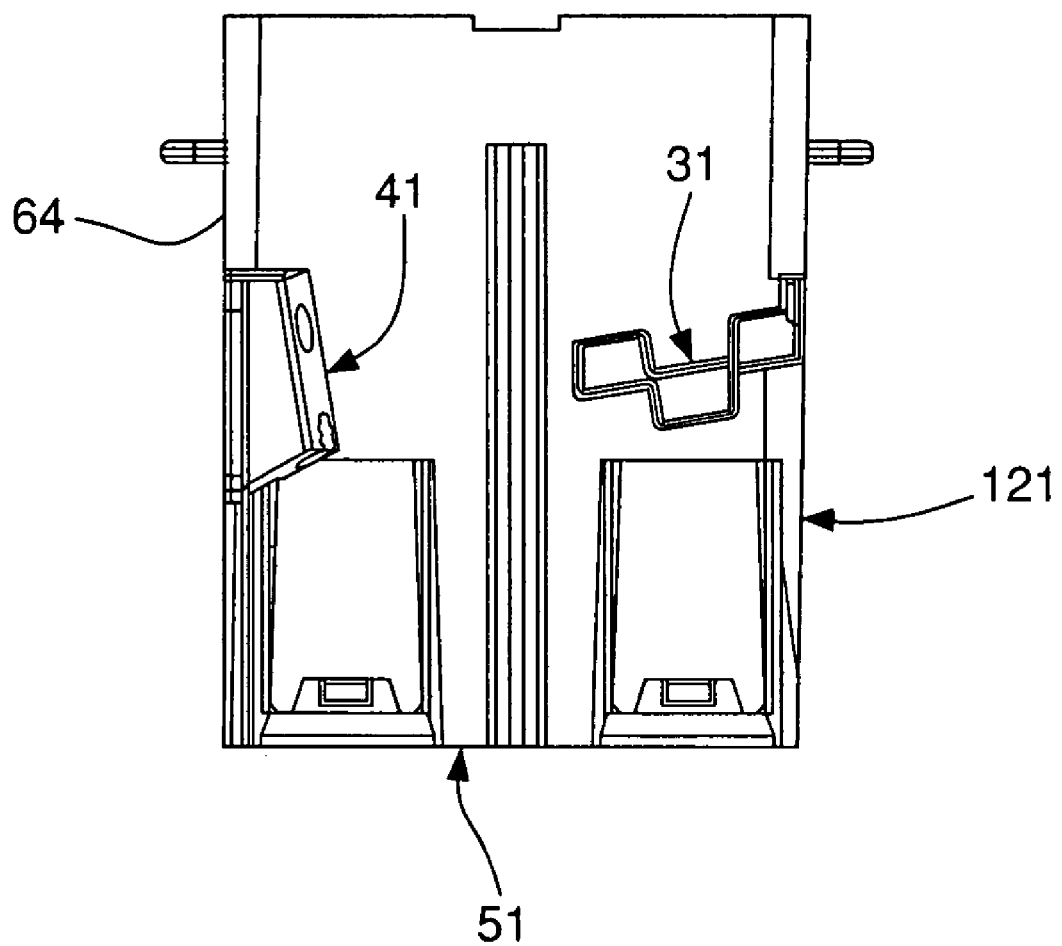
FIG. 12 is a bottom plan view of the electrical box of FIG. 7.
Figure 13:
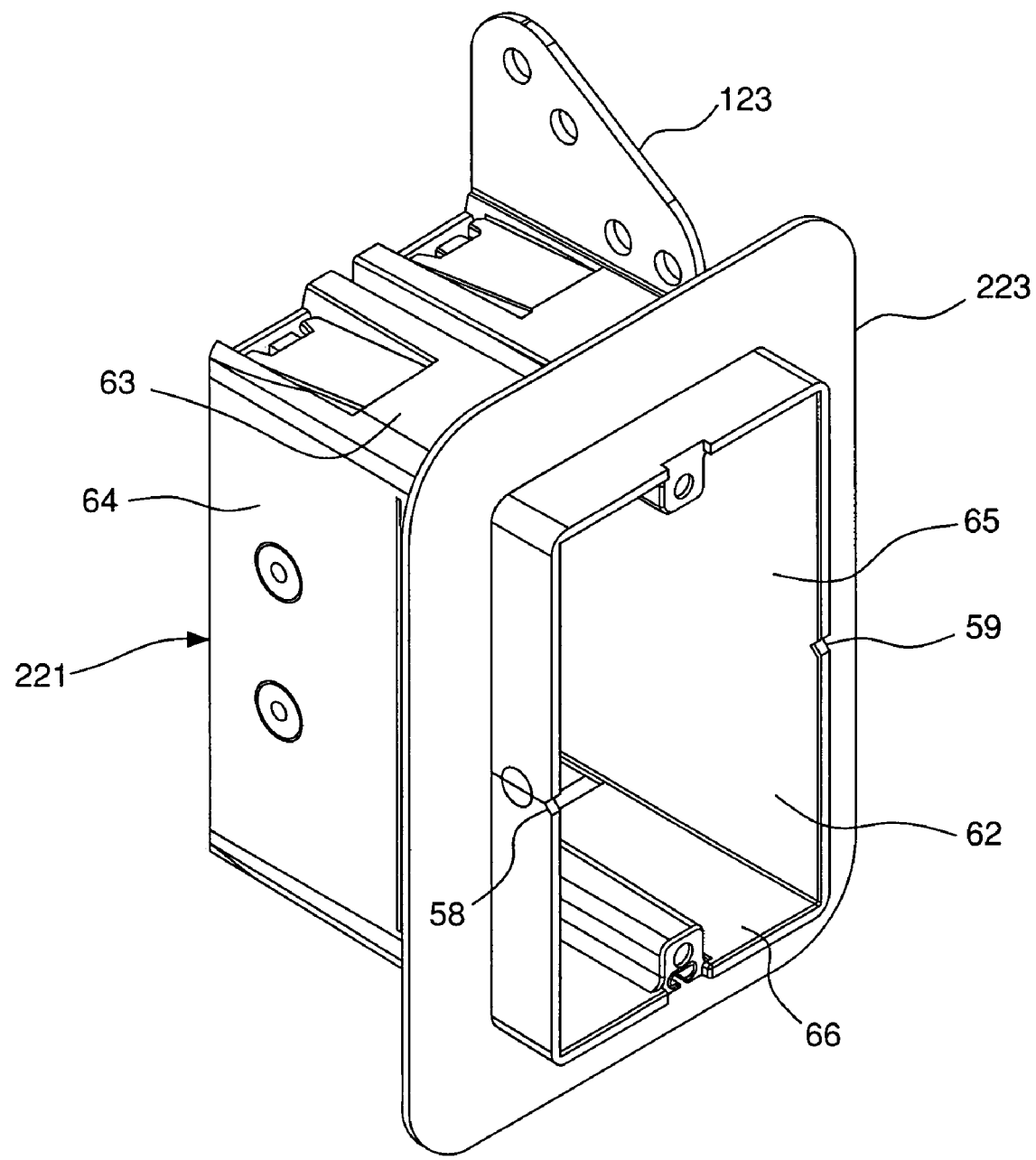
FIG. 13 is a perspective view of an electrical box having a vapor barrier according to a third exemplary embodiment of the present invention.
Figure 14:
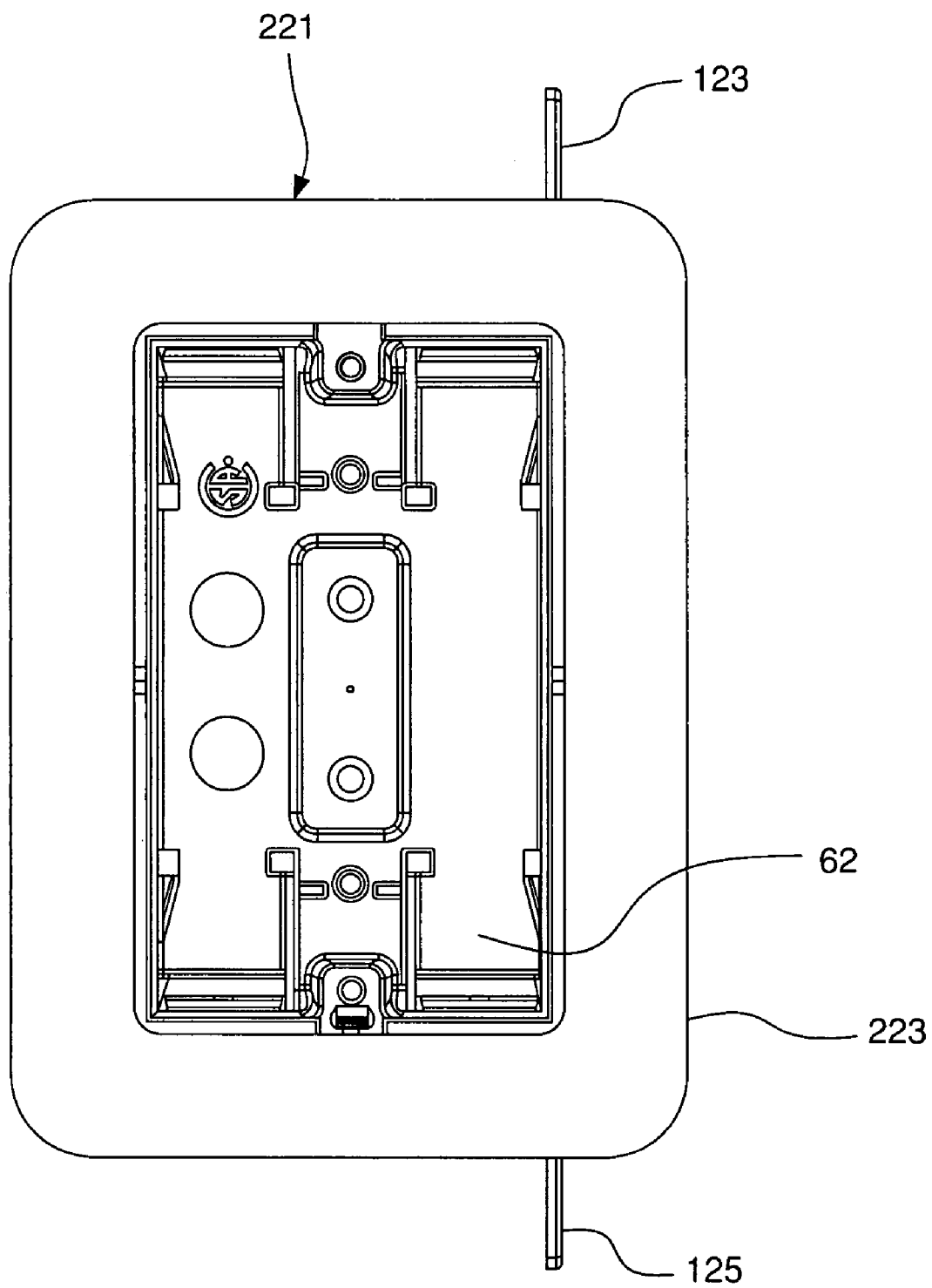
FIG. 14 is a front elevational view of the electrical box of FIG. 13.
Figure 15:
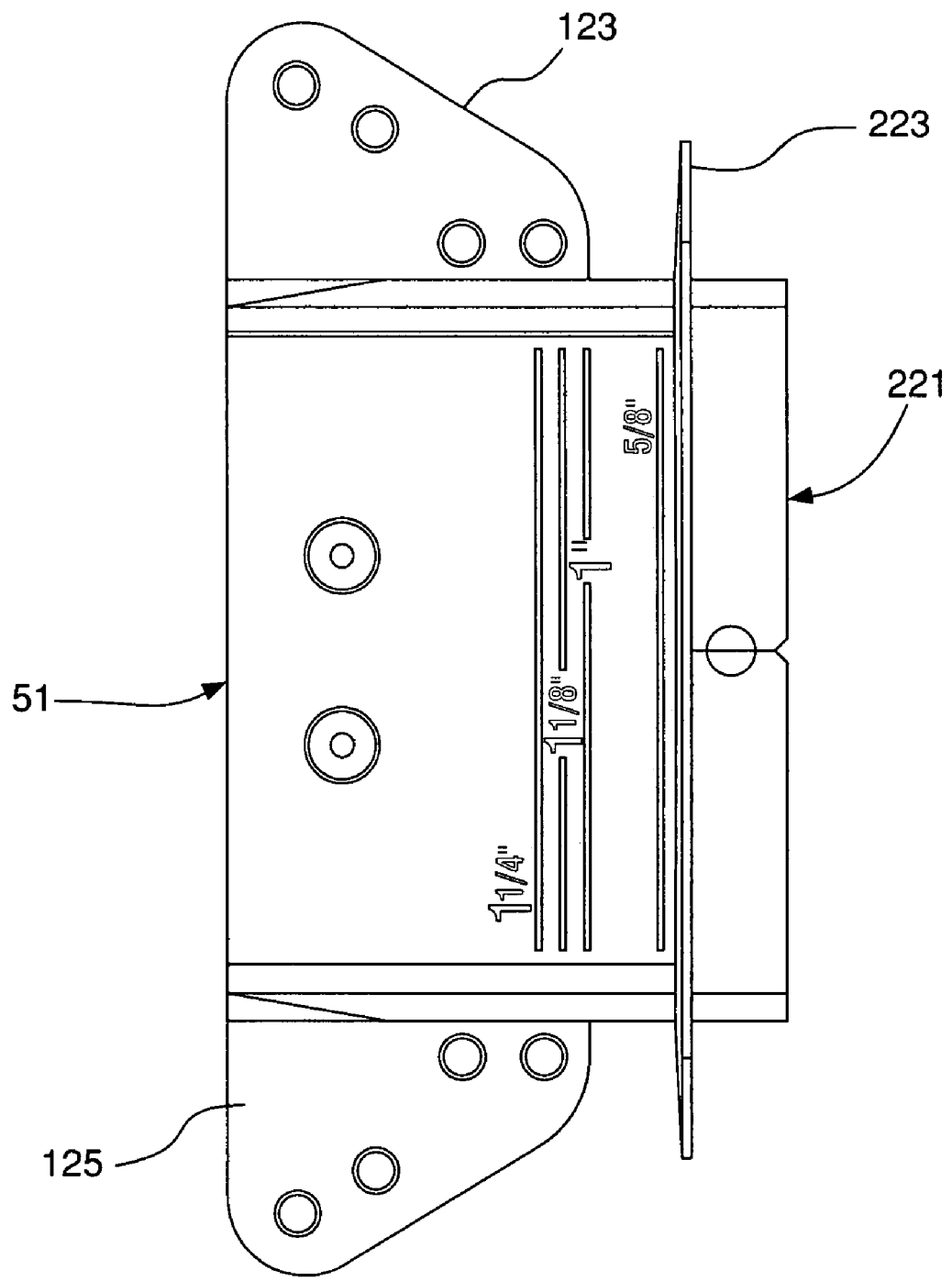
FIG. 15 is a left side elevational view of the electrical box of FIG. 13.
Figure 16:
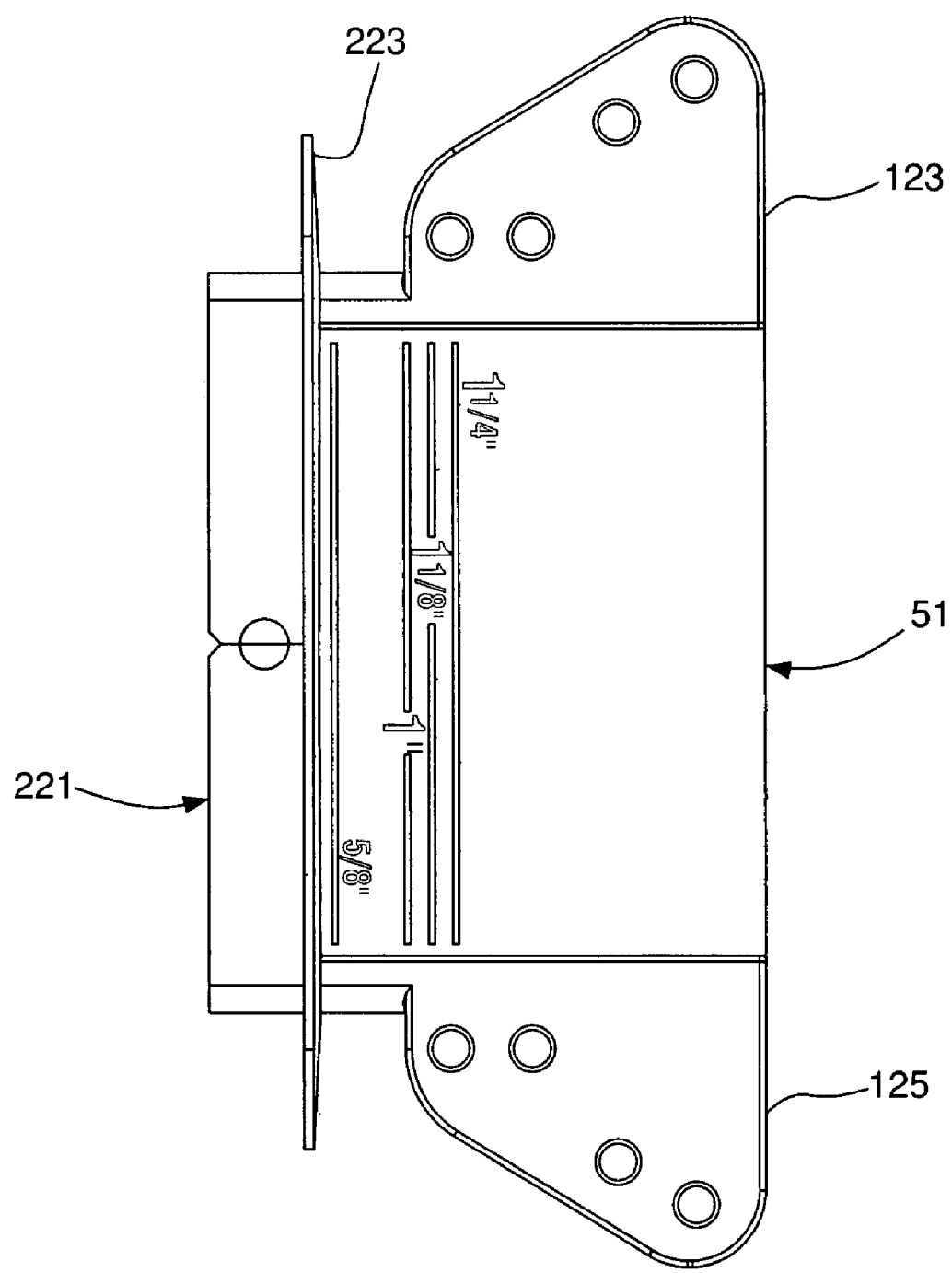
FIG. 16 is a right side elevational view of the electrical box of FIG. 13.
Figure 17:
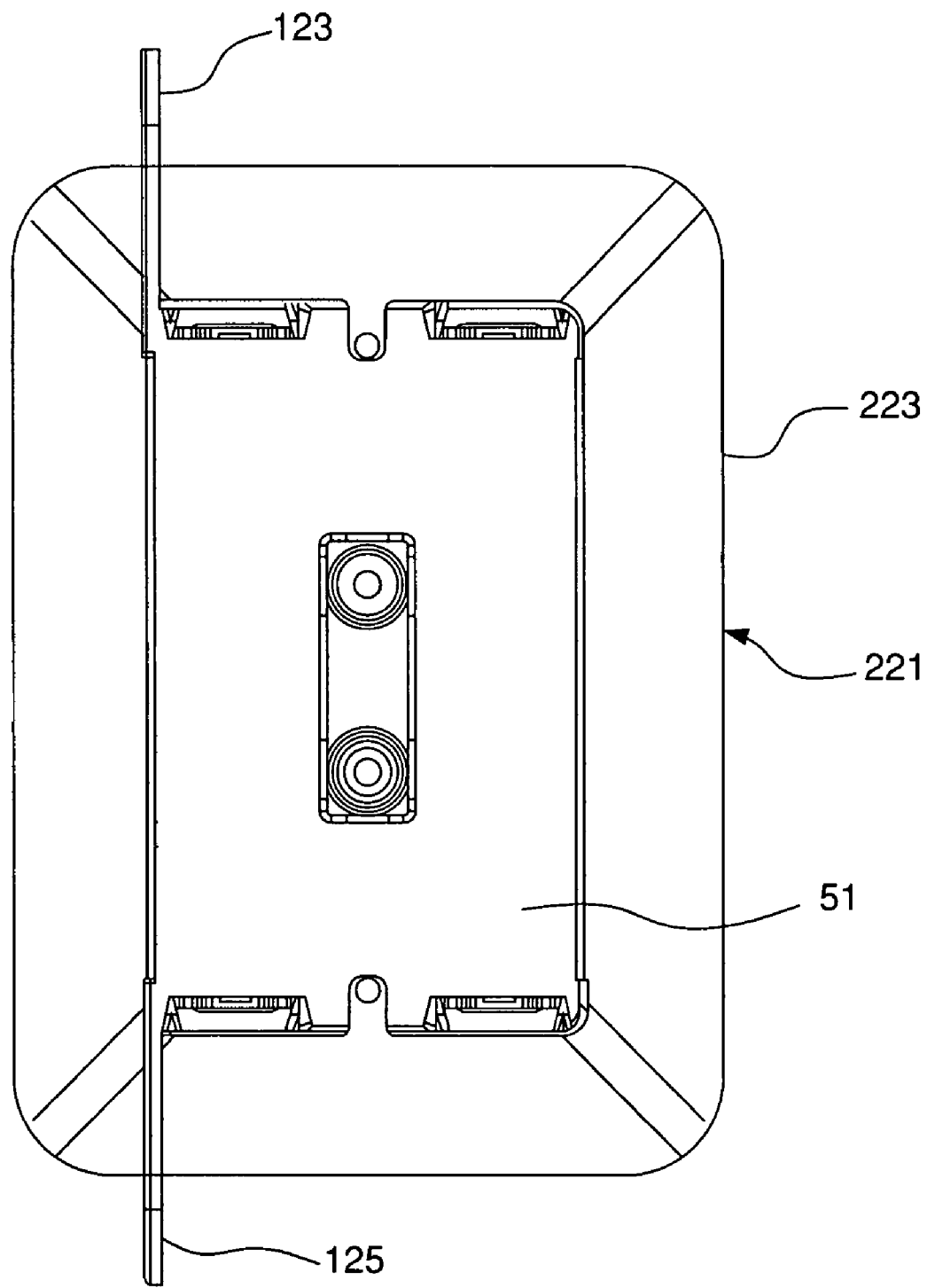
FIG. 17 is a rear elevational view of the electrical box of FIG. 13.
Figure 18:
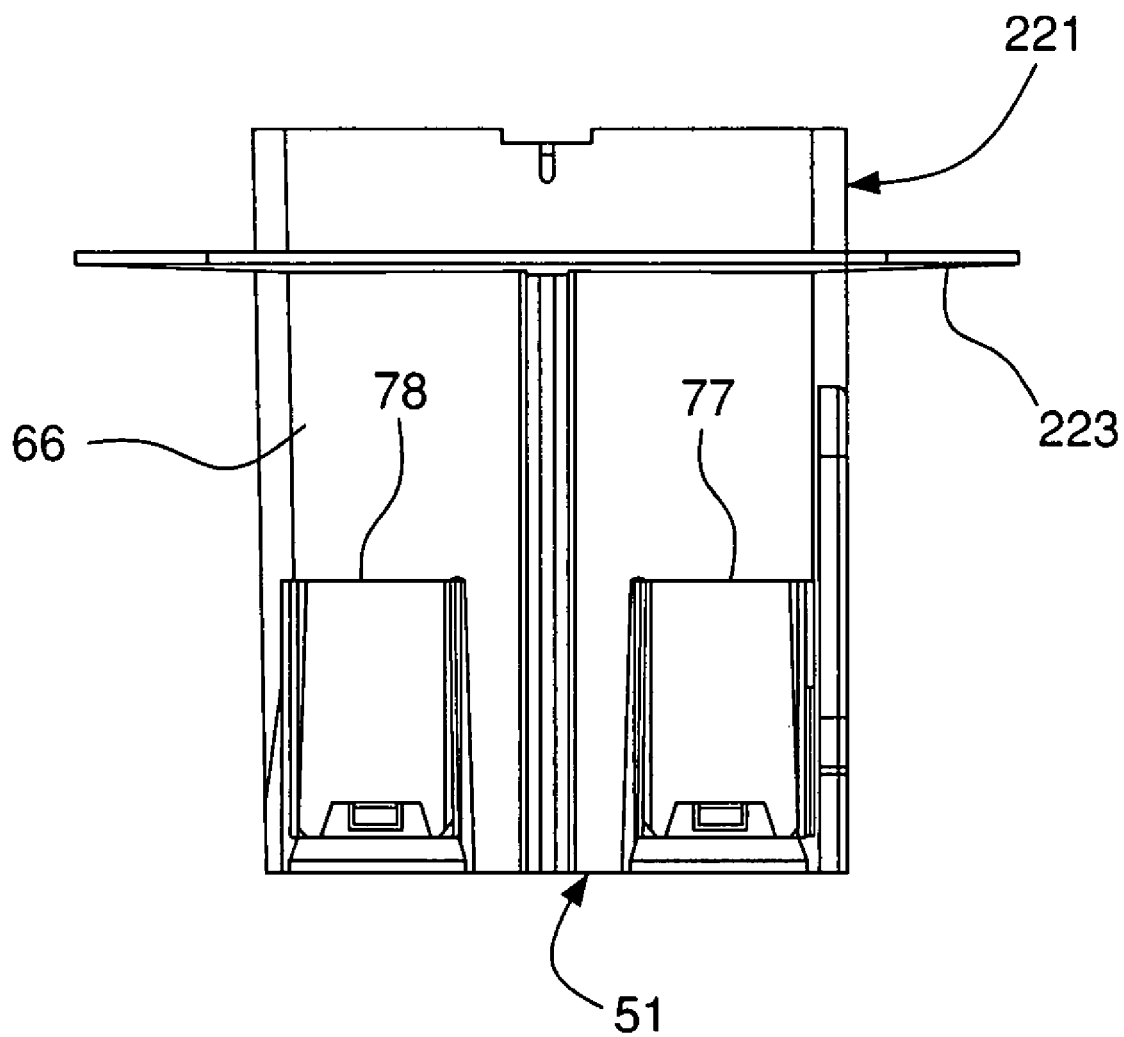
FIG. 18 is a bottom plan view of the electrical box of FIG. 13.

First and second wings 123 and 125 extend outwardly from the upper and lower edges of the first side wall 64, as shown in FIGS. 8-11. The first wing 123 has first and second fastener holes 122 and 124. The second wing 125 has first and second fastener holes 126 and 128. The fastener holes in the first and second wings 123 and 125 are adapted to receive additional fasteners to facilitate mounting the electrical box assembly 121 to a support. A score line 129 may connect the wings 123 and 125 to the electrical box assembly 121, as shown in FIG. 7, such that the wings may be removed when not required for installation. Preferably, the first and second wings 123 and 125 are substantially flush with the first side wall 64.

A third exemplary embodiment of the electrical box assembly 221 is shown in FIGS. 13-18. The electrical box assembly 221 of the third exemplary embodiment is substantially similar to the electrical box assembly 121 of the second exemplary embodiment and the same reference numerals are used to denote corresponding features. Although the electrical box assembly 221 is shown without fastener supports 31, 32, 41 and 42, the electrical box assembly 221 may include such features.

A vapor barrier 223 extends around the entire outer surface of the electrical box assembly 221, as shown in FIGS. 13-18. Preferably, the vapor barrier 223 extends substantially perpendicularly from each of the top, first and second side bottom walls 63, 64, 65 and 66. A gasket (not shown) may be disposed between the vapor barrier 223 and the wall to substantially prevent the passage of moisture and air through exterior walls and into the space served by the electrical box assembly 221.

Preferably, the electrical box assembly 21 is made of a non-metallic material, such as a plastic, thereby providing a lightweight electrical box assembly without sharp edges. Furthermore, the electrical box assembly may be made of a bright color, such as yellow, such that the electrical box assembly is easily located by an installer and easily visible as well, even in locations that are poorly lit.

Assembly and Disassembly

As shown in FIGS. 19-27, the exemplary embodiments of the electrical box assemblies 21 and 121 of the present invention are shown mounted to a support 11, such as a stud. As shown in FIGS. 19-22 and 26, the electrical box assembly is secured to the support 11 using first fasteners 131 and 132. As shown in FIGS. 23-25 and 27, the electrical box assembly is secured to the support 11 using second fasteners 133 and 134.

Installation of the electrical box assembly 121 according to the second exemplary embodiment of the present invention is described hereafter. Installation of other exemplary embodiments is substantially similar to that of the electrical box assembly 121 according to the second exemplary embodiment.

As shown in FIG. 19, the electrical box assembly 121 is positioned such that the first side wall 64 is adjacent the support 11. A first fastener 131 is then inserted through the first fastener support 31 and the second fastener opening 44 in the second fastener support 41 into the support 11, thereby securing the electrical box assembly 121 to the support 11. Another first fastener 132 is then inserted in the same manner through the third and fourth fastener supports 32 and 42 on the bottom wall 66 of the electrical box assembly 121, as shown in FIGS. 19 and 22.

Alternatively, a second fastener 133 may be inserted through the first fastener opening 43 in the second fastener support 41, as shown in FIG. 23, to secure the electrical box assembly 121 to the support 11. Another second fastener 134 is then inserted through the fourth fastener support 42 on the bottom wall 66 of the electrical box assembly 121, as shown in FIG. 24. The fastener openings for the second fasteners 133 and 134 in the second and fourth fastener supports 41 and 42 are preferably angled such that the inserted second fasteners are not perpendicular to the support 11, as shown in FIG. 24.

Figure 20:
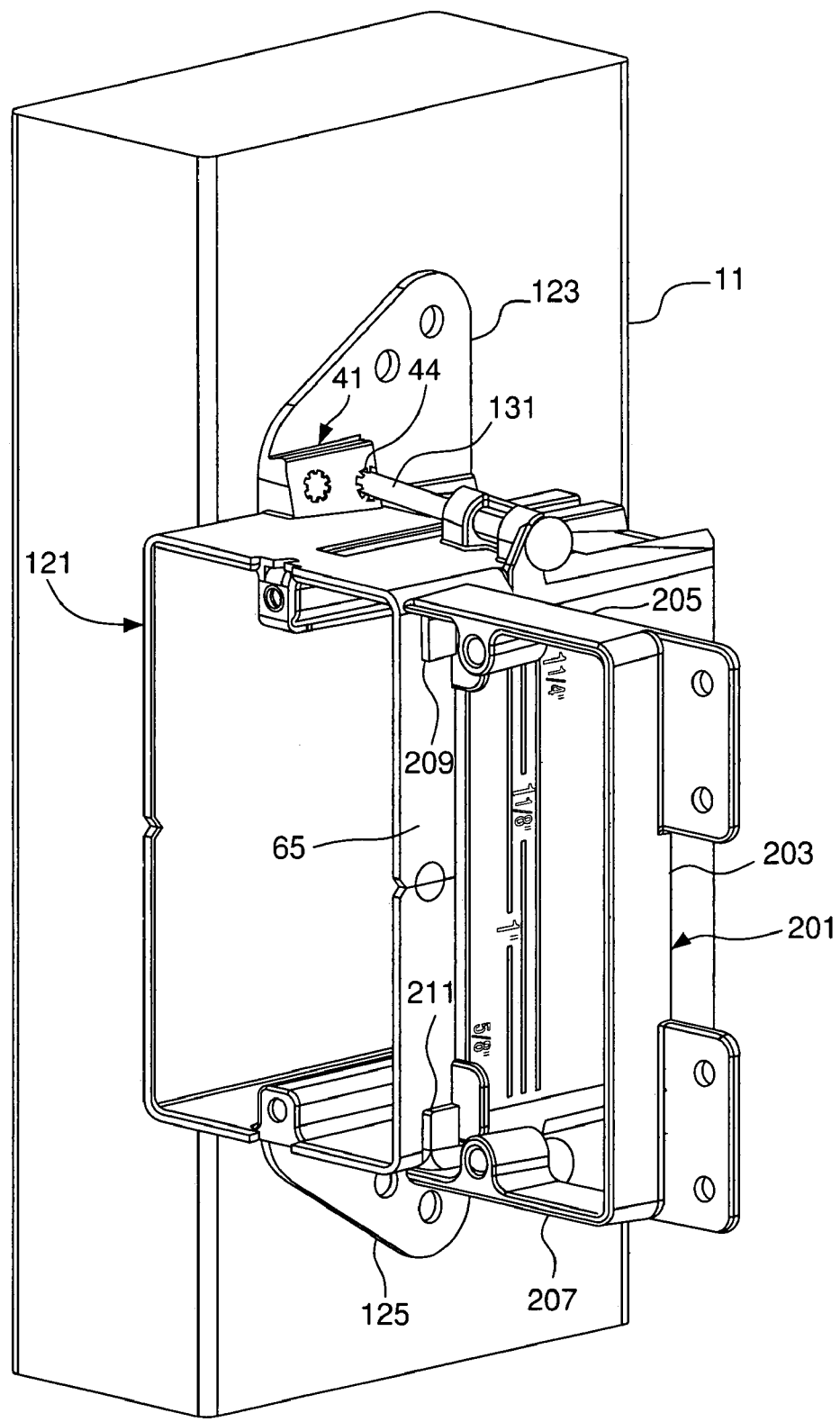
FIG. 20 is a perspective view of the electrical box of FIG. 19 to which a low voltage frame is attached.
Figure 21:
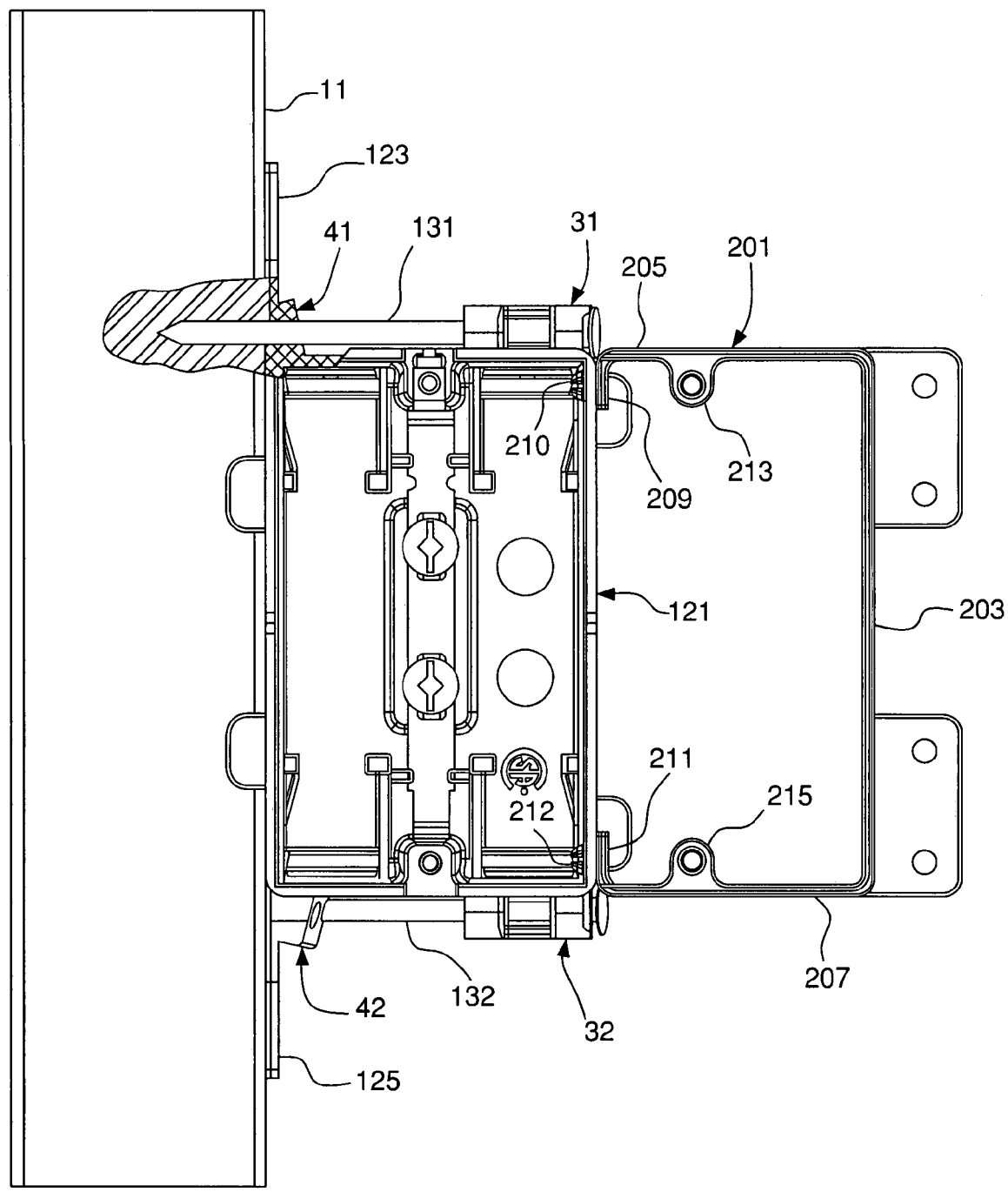
FIG. 21 is a front elevational view in partial cross section of the electrical box of FIG. 20.

After the electrical box assembly 121 has been secured to the support 11, the low voltage frame 201 may be attached to the electrical box assembly. First and second protrusions 210 and 212 are inserted through the mounting holes 91 and 93 in the second side wall 65 of the electrical box assembly 121, as shown in FIG. 20. Preferably, the first and second protrusions 210 and 212 are flexible, such that the first and second protrusions flex inwardly to pass through the mounting holes 91 and 93. A portion 216 and 217 of the first and second protrusions is larger than the diameter of the mounting holes 91 and 93 to prevent the low voltage frame from being accidentally removed.

An electrical low voltage connector 217 is then connected to the low voltage frame 201, as shown in FIG. 22. Fasteners 214 and 216 are inserted through openings 218 and 219 in the electrical connector 217 and are received by the mounting holes 213 and 215 in the low voltage frame 201, thereby securing the electrical low voltage connector to the low voltage frame.

While advantageous embodiments have been chosen to illustrate the invention, it will be understood by those skilled in the art that various changes and modifications may be made therein without departing from the scope of the invention as defined in the appended claims.

What is claimed is:

1. An electrical box assembly, comprising:
    a base having an outer edge;
    a plurality of walls extending outwardly from said outer edge of said base and forming a cavity therein;
    a first fastener support on one of said walls having a first opening adapted to receive a first fastener; and
    a second fastener support on said wall having said first fastener support and having a second opening of a different size than said first opening adapted to receive a second fastener, wherein said first and second fasteners are different types of fasteners and one of said first and second fasteners passes through both the first and second fastener supports.

2. An electrical box assembly according to claim 1, wherein
    said first fastener support is adapted to receive a screw, and said second fastener support is adapted to receive a nail.

3. An electrical box assembly according to claim 1, wherein
    said base is substantially rectangular and has top, bottom and first and second side edges, and top, bottom and first and second side walls extend from each of said edges of said base.

4. An electrical box assembly according to claim 3, wherein
    said first and second fastener supports are both on one of said walls.

5. An electrical box assembly according to claim 4, wherein
    a third fastener support is adapted to receive a third fastener, and a fourth fastener support is adapted to receive a fourth fastener, wherein said third fastener is similar to said first fastener and said fourth fastener is similar to said second fastener.

6. An electrical box assembly according to claim 5, wherein
    said third and fourth fastener supports are disposed on one of said walls opposite said wall having said first and second fastener supports.

7. An electrical box assembly according to claim 3, wherein
    a first mark is disposed on one of said first and second side walls and centered between said top and bottom walls to facilitate alignment of a plurality of electrical box assemblies.

8. An electrical box assembly according to claim 7, wherein
    a second mark is disposed on said other of said first and second side walls and centered between said top and bottom walls to facilitate alignment of a plurality of electrical box assemblies.

9. An electrical box assembly according to claim 1, wherein
    at least one mounting hole is disposed in one of said walls adapted to receive a corresponding member disposed on an outer wall of a second box.

10. An electrical box assembly according to claim 1, wherein
    said first fastener support has a channel adapted to receive said first fastener.

11. An electrical box assembly according to claim 10, wherein
    said channel has a width substantially equivalent to a diameter of said first fastener to prevent accidental separation of said first fastener from said electrical box prior to installation of said electrical box.

12. An electrical box assembly according to claim 1, wherein
    said second fastener support has at least two arms adapted to receive said second fastener.

13. An electrical box assembly according to claim 12, wherein said at least two arms are adapted to provide an interference fit with said second fastener to prevent accidental separation of said second fastener from said electrical box prior to installation of said electrical box.

14. An electrical box assembly according to claim 13, wherein
each of said at least two arms has inwardly extending ribs to further provide an interference fit with said second fastener.

15. An electrical box assembly according to claim 1, wherein
said electrical box is non-metallic.

16. An electrical box assembly according to claim 1, wherein
a wing extends outwardly from said wall and has a fastener hole adapted to receive a third fastener to secure said electrical box to a support.

17. An electrical box assembly according to claim 16, wherein
said wing is removably connected to said wall.

18. An electrical box assembly according to claim 1, wherein
a flange extends substantially perpendicularly outwardly around a perimeter of said plurality of walls and is adapted to receive a seal member.

19. An electrical box assembly according to claim 1, wherein
a tab extends outwardly from one of said walls and is adapted to engage a support to position said electrical box at a predetermined depth.

20. An electrical box assembly, comprising:
a substantially rectangular base having a top outer edge, a bottom outer edge, and first and second side outer edges;
a top wall extending outwardly from said top outer edge, a bottom wall extending outwardly from said bottom outer edge, a first side wall extending outwardly from said first side outer edge and a second side wall extending outwardly from said second side outer edge, a cavity being formed by said top, bottom, first and second outer walls and said base;
a first fastener support on said top wall having a first opening adapted to receive a first fastener; and
a second fastener support on said top wall having a second opening of a different size than said first opening adapted to receive a second fastener, wherein said first and second fasteners are different types of fasteners and one of said first and second fasteners passes through both the first and second fastener supports.

21. An electrical box assembly according to claim 20, wherein
said first fastener support is adapted to receive a screw, and said second fastener support is adapted to receive a nail.

22. An electrical box assembly according to claim 20, wherein
a third fastener support on said bottom wall is adapted to receive a third fastener, and a fourth fastener support on said bottom wall is adapted to receive a fourth fastener, wherein said third fastener is similar to said first fastener and said fourth fastener is similar to said second fastener.

23. An electrical box assembly according to claim 20, wherein
at least one mounting hole is disposed in one of said first and second side walls adapted to receive a corresponding member disposed on an outer wall of a second box.

24. An electrical box assembly according to claim 20, wherein
said first fastener support has a channel adapted to receive said first fastener.

25. An electrical box assembly according to claim 24, wherein
said channel has a width substantially equivalent to a diameter of said first fastener to prevent accidental separation of said first fastener from said electrical box prior to installation of said electrical box.

26. An electrical box assembly according to claim 20, wherein
said second fastener support has at least two arms adapted to receive said second fastener.

27. An electrical box assembly according to claim 26, wherein
said at least two arms are adapted to provide an interference fit with said second fastener to prevent accidental separation of said second fastener from said electrical box prior to installation of said electrical box.

28. An electrical box assembly according to claim 26, wherein
each of said at least two arms has inwardly extending ribs to further provide an interference fit with said second fastener.

29. An electrical box assembly according to claim 20, wherein
a wing extends outwardly from said top wall and has a fastener hole adapted to receive a third fastener to secure said electrical box to a support.

30. An electrical box assembly according to claim 29, wherein
said wing is removably connected to said wall.

31. An electrical box assembly according to claim 20, wherein
a flange extends substantially perpendicularly and continuously outwardly from said top, first and second side and bottom walls and is adapted to receive a seal member.

32. An electrical box assembly according to claim 20, wherein
said electrical box is non-metallic.

33. An electrical box assembly according to claim 32, wherein
said electrical box is yellow to facilitate visibility.

34. An electrical box assembly according to claim 20, wherein
a tab extends outwardly from at least one of said first and second side walls, said tab being adapted to engage a support to position said electrical box at a predetermined depth.

35. An electrical box assembly according to claim 20, wherein
a first mark is disposed on one of said first and second side walls and centered between said top and bottom walls to facilitate alignment of a plurality of electrical box assemblies.

36. An electrical box assembly according to claim 35, wherein
a second mark is disposed on said other of said first and second side walls and centered between said top and bottom walls to facilitate alignment of a plurality of electrical box assemblies.

* * * * *